United States Patent
Oh et al.

(10) Patent No.: US 11,979,607 B2
(45) Date of Patent: May 7, 2024

(54) APPARATUS AND METHOD FOR PROCESSING POINT CLOUD DATA

(71) Applicant: LG ELECTRONICS INC., Seoul (KR)

(72) Inventors: Hyunmook Oh, Seoul (KR); Sejin Oh, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 228 days.

(21) Appl. No.: 17/610,072

(22) PCT Filed: May 7, 2020

(86) PCT No.: PCT/KR2020/005985
§ 371 (c)(1),
(2) Date: Nov. 9, 2021

(87) PCT Pub. No.: WO2020/242077
PCT Pub. Date: Dec. 3, 2020

(65) Prior Publication Data
US 2022/0239945 A1    Jul. 28, 2022

Related U.S. Application Data

(60) Provisional application No. 62/854,331, filed on May 30, 2019.

(51) Int. Cl.
*H04N 19/597* (2014.01)
*H04N 19/30* (2014.01)
*H04N 19/46* (2014.01)

(52) U.S. Cl.
CPC ........... *H04N 19/597* (2014.11); *H04N 19/30* (2014.11); *H04N 19/46* (2014.11)

(58) Field of Classification Search
CPC ...... H04N 19/597; H04N 19/30; H04N 19/46; H04N 13/161; G06T 9/001
USPC ....................................... 375/240.12
See application file for complete search history.

(56) References Cited

U.S. PATENT DOCUMENTS

| | | |
|---|---|---|
| 2017/0347122 A1 | 11/2017 | Chou et al. |
| 2019/0080483 A1 | 3/2019 | Mammou et al. |
| 2019/0081638 A1 | 3/2019 | Mammou et al. |
| 2019/0349597 A1* | 11/2019 | Fleureau .............. H04N 19/70 |
| 2021/0027505 A1* | 1/2021 | Yano ................. H04N 19/115 |

(Continued)

FOREIGN PATENT DOCUMENTS

EP   3 340 629 A1 * 12/2016 ............. H04N 19/65

OTHER PUBLICATIONS

Birendra Kathariya et al., "Scalable Point Cloud Geometry Coding With Binary Tree Embedded Quadtree", 2018 IEEE International Conference on Multimedia and Expo (ICME), Jul. 23-27, 2018.

(Continued)

*Primary Examiner* — Marnie A Matt
(74) *Attorney, Agent, or Firm* — Bryan Cave Leighton Paisner LLP

(57) ABSTRACT

A method for processing point cloud data may encode point cloud data including geometry information and attribute information and transmit a bitstream including the encoded point cloud data. The method for processing point cloud data may receive a bitstream including the point cloud data including geometry information and attribute information and decode the received point cloud data.

16 Claims, 27 Drawing Sheets

(56) References Cited

U.S. PATENT DOCUMENTS

2021/0183109 A1\* 6/2021 Chevet ................. H04N 19/597
2022/0051444 A1\* 2/2022 Iguchi .................. H04N 13/161

OTHER PUBLICATIONS

Khaled Mammou et al., "G-PCC codec description v2", International Organisation for Standardisation Organisation Internationale De Normalisation ISO/IEC JTC1/SC29/WG11 Coding of Moving Pictures and Audio, N18189, Jan. 2019.

\* cited by examiner

FIG. 6
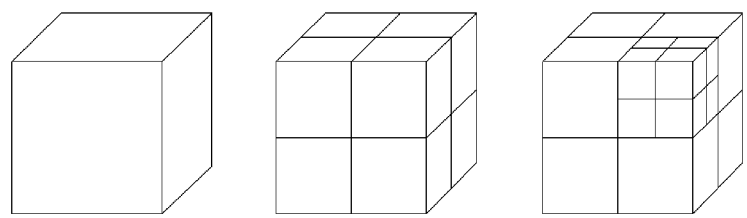
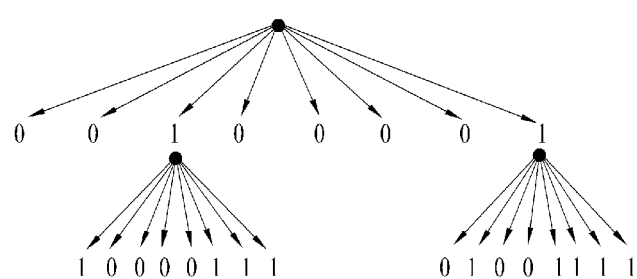

FIG. 7
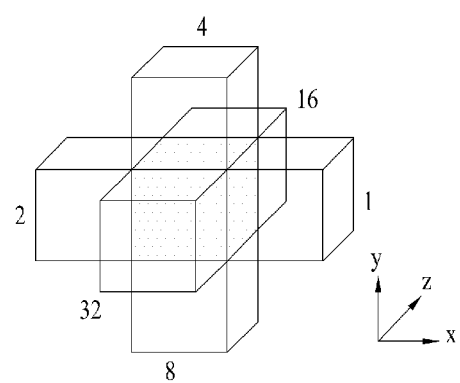
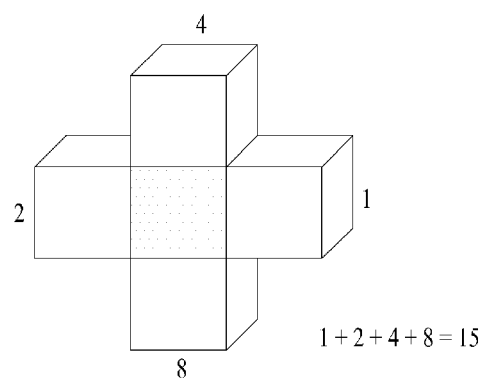
1 + 2 + 4 + 8 = 15

FIG. 21

$$\begin{bmatrix} b_0 \\ c_0 \end{bmatrix} = T_{11} \begin{bmatrix} a_6 \\ a_7 \end{bmatrix} \quad 2110$$

$$\begin{bmatrix} d_0 \\ e_0 \end{bmatrix} = T_{11} \begin{bmatrix} a_1 \\ a_2 \end{bmatrix} \quad \begin{bmatrix} d_2 \\ e_2 \end{bmatrix} = T_{12} \begin{bmatrix} a_4 \\ b_0 \end{bmatrix}$$

$$\begin{bmatrix} d_1 \\ e_1 \end{bmatrix} = T_{11} \begin{bmatrix} a_3 \\ a_5 \end{bmatrix} \quad 2120$$

$$\begin{bmatrix} f_0 \\ g_0 \end{bmatrix} = T_{12} \begin{bmatrix} a_0 \\ d_0 \end{bmatrix} \quad \begin{bmatrix} f_1 \\ g_1 \end{bmatrix} = T_{23} \begin{bmatrix} d_1 \\ d_2 \end{bmatrix} \quad 2130$$

$$\begin{bmatrix} h_0 \\ i_0 \end{bmatrix} = T_{35} \begin{bmatrix} f_0 \\ f_1 \end{bmatrix} \quad 2140$$

FIG. 22

$$T_{W1,W2=1} = \frac{1}{\sqrt{2}} \begin{bmatrix} 1 & 1 \\ -1 & 1 \end{bmatrix}$$

$$T_{a,b} = \frac{1}{\sqrt{a^2 + b^2}} \begin{bmatrix} a & b \\ -b & a \end{bmatrix}$$

FIG. 23

| attribute_parameter_set( ) { | Descriptor |
|---|---|
| aps_attr_parameter_set_id | ue(v) |
| aps_seq_parameter_set_id | ue(v) |
| attr_coding_type | ue(v) |
| ...... | |
| if( attribute_coding_type == 1 ) { //RAHT | |
| raht_scalable_attribute_coding_flag | u(1) |
| if ( raht_scalable_attribute_coding_flag ) { | |
| raht_depth_level_full_presentation | u(8) |
| raht_num_point_full_presentation | u(16) |
| num_partial_presentation | |
| for( i=0; i< num_partial_presentation; i ) { | |
| index = i | |
| raht_depth_level_partial_presentation [index] | u(8) |
| raht_num_point_partial_presentation [index] | u(16) |
| } | |
| raht_non_adaptive_transform_coefficient_flag | u(1) |
| if( raht_non_adaptive_transform_coefficient_flag ) { | |
| raht_equal_transform_coefficient_flag | |
| if( raht_equal_transform_coefficient_flag ) { | |
| num_coefficients | u(8) |
| for (i=0; i< num_coefficient; i++) | |
| non_adaptive_transform_coefficient [i] | ue(v) |
| } | |

(2300)

| else { | |
|---|---|
| raht_geometry_octree_full_depth_level_flag | u(1) |
| if ( !raht_geometry_octree_full_depth_level_flag ) { | |
| for( i=0; i< num_partial_presentation; i++) | |
| raht_coeff_for_partial_presentation_depth_present_flag [i] | u(1) |
| } | |
| raht_depth | ue(v) |
| raht_quant_step_size | ue(v) |
| raht_quant_step_size_chroma | ue(v) |
| } | |
| aps_extension_present_flag | u(1) |
| if( aps_extension_present_flag ) | |
| while( more_data_in_byte_stream( ) ) | |
| aps_extension_data_flag | u(1) |
| byte_alignment( ) | |
| } | |

| general_attribute_slice_bitstream( ) { | Descriptor |
|---|---|
| attribute_slice_header( ) | |
| attribute_slice_data( ) | |
| } | |

2410

| attribute_slice_header( ) { | Descriptor |
|---|---|
| ash_attr_parameter_set_id | ue(v) |
| ash_attr_sps_attr_idx | ue(v) |
| ash_attr_geom_slice_id | ue(v) |
| byte_alignment() | |
| } | |

2430

| RAHT_coeff_bitstream( raht_num_point_partial_presentation [index] ) { | Descriptor |
|---|---|
| for( j = 0; j < raht_num_point_partial_presentation [index]; j-- ) { | |
| num_descendent_voxels[ j ] | ue(16) |
| } | |
| } | |

2420

| attribute_slice_data( ) { | Descriptor |
|---|---|
| dimension = attribute_dimension[ ash_attr_sps_attr_idx ] | |
| if( attr_coding_type == 0 ) | |
| PredictingWeight_Lifting_bitstream( dimension ) | |
| else if( attr_coding_type == 1 ) | |
| for( i=0; i< num_partial_presentation; i++) | |
| index = i | |
| if( raht_coeff_for_partial_presentation_depth_present_flag [index] ) { | |
| RAHT_coeff_bitstream ( raht_num_point_partial_presentation [index] ) | |
| } | |
| RAHT_bitstream( dimension ) | |
| } | |
| else if( attr_coding_type == 2 ) | |
| FixedWeight_Lifting_bitstream( dimension ) | |
| byte_alignment( ) | |
| } | |

APPARATUS AND METHOD FOR PROCESSING POINT CLOUD DATA

CROSS-REFERENCE TO RELATED APPLICATIONS

This application is the National Stage filing under 35 U.S.C. 371 of International Application No. PCT/KR2020/005985, filed on May 7, 2020, which claims the benefit of U.S. Provisional Application No. 62/854,331 filed on May 30, 2019, the contents of which are all hereby incorporated by reference herein in their entirety.

TECHNICAL FIELD

The present disclosure provides a method for providing point cloud contents to provide a user with various services such as virtual reality (VR), augmented reality (AR), mixed reality (MR), and self-driving services.

BACKGROUND ART

Point cloud content is content represented by a point cloud, which is a set of points belonging to a coordinate system representing a three-dimensional space. The point cloud content may express media configured in three dimensions, and is used to provide various services such as virtual reality (VR), augmented reality (AR), mixed reality (MR), and self-driving services. However, tens of thousands to hundreds of thousands of point data are required to represent point cloud content. Therefore, there is a need for a method for efficiently processing a large amount of point data.

DISCLOSURE

Technical Problem

Embodiments provide a device and method for efficiently processing point cloud data. Embodiments provide a point cloud data processing method and device for addressing latency and encoding/decoding complexity.

The technical scope of the embodiments is not limited to the aforementioned technical objects, and may be extended to other technical objects that may be inferred by those skilled in the art based on the entire contents disclosed herein.

Technical Solution

To efficiently process point cloud data, in some embodiments, a method for processing point cloud data may include encoding the point cloud data including geometry information and attribute information. In some embodiments, the geometry information indicates positions of points of the point cloud data and the attribute information indicates attributes of the points of the point cloud data. In some embodiments, the method includes transmitting a bitstream including the encoded point cloud data.

In some embodiments, a method for processing point cloud data may include receiving a bitstream including the point cloud data, and decoding the point cloud data including geometry information and attribute information. In some embodiments, the geometry information indicates positions of points of the point cloud data, and the attribute information indicates attributes of the points of the point cloud data.

In some embodiments, an apparatus for processing point cloud data may include an encoder configured to encode point cloud data including geometry information and attribute information, and a transmitter configured to transmit a bitstream including the encoded point cloud data. In some embodiments, the geometry information indicates positions of points of the point cloud data, and the attribute information indicates attributes of the points of the point cloud data.

In some embodiments, an apparatus for processing point cloud data may include a receiver configured to receive a bitstream including point cloud data and a decoder configured to decode the point cloud data including geometry information and attribute information. In some embodiments, the geometry information indicates positions of points of the point cloud data, and the attribute information indicates attributes of the points of the point cloud data.

Advantageous Effects

Devices and methods according to embodiments may process point cloud data with high efficiency.

The devices and methods according to the embodiments may provide a high-quality point cloud service.

The devices and methods according to the embodiments may provide point cloud content for providing general-purpose services such as a VR service and a self-driving service.

DESCRIPTION OF DRAWINGS

The accompanying drawings, which are included to provide a further understanding of the disclosure and are incorporated in and constitute a part of this application, illustrate embodiment(s) of the disclosure and together with the description serve to explain the principle of the disclosure.

For a better understanding of various embodiments described below, reference should be made to the description of the following embodiments in connection with the accompanying drawings. In the drawings:

FIG. 6 shows an example of an octree and occupancy code according to embodiments;

FIG. 7 shows an example of a neighbor node pattern according to embodiments;

FIG. 21 shows an example of a transform of RAHT coding according to embodiments.

FIG. 22 shows an example of a RAHT transform for scalable decoding according to embodiments.

FIG. 23 shows an example of syntax for APS according to embodiments.

FIG. 24 shows an example of syntax for an attribute slice bitstream according to embodiments.

BEST MODE

Reference will now be made in detail to the preferred embodiments of the present disclosure, examples of which are illustrated in the accompanying drawings. The detailed description, which will be given below with reference to the accompanying drawings, is intended to explain exemplary embodiments of the present disclosure, rather than to show the only embodiments that may be implemented according to the present disclosure. The following detailed description includes specific details in order to provide a thorough understanding of the present disclosure. However, it will be apparent to those skilled in the art that the present disclosure may be practiced without such specific details.

Although most terms used in the present disclosure have been selected from general ones widely used in the art, some terms have been arbitrarily selected by the applicant and their meanings are explained in detail in the following description as needed. Thus, the present disclosure should be understood based upon the intended meanings of the terms rather than their simple names or meanings.

Figure 1:
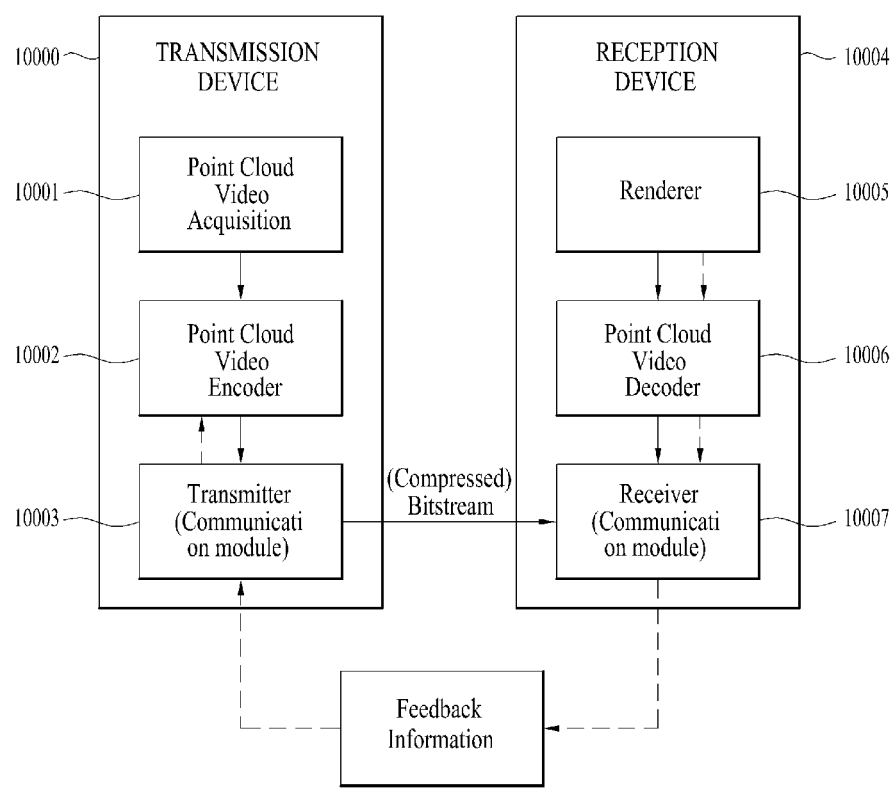
FIG. 1 shows an exemplary point cloud content providing system according to embodiments.

FIG. 1 shows an exemplary point cloud content providing system according to embodiments.

The point cloud content providing system illustrated in FIG. 1 may include a transmission device 10000 and a reception device 10004. The transmission device 10000 and the reception device 10004 are capable of wired or wireless communication to transmit and receive point cloud data.

The point cloud data transmission device 10000 according to the embodiments may secure and process point cloud video (or point cloud content) and transmit the same. According to embodiments, the transmission device 10000 may include a fixed station, a base transceiver system (BTS), a network, an artificial intelligence (AI) device and/or system, a robot, an AR/VR/XR device and/or server. According to embodiments, the transmission device 10000 may include a device, a robot, a vehicle, an AR/VR/XR device, a portable device, a home appliance, an Internet of Thing (IoT) device, and an AI device/server which are configured to perform communication with a base station and/or other wireless devices using a radio access technology (e.g., 5G New RAT (NR), Long Term Evolution (LTE)).

The transmission device 10000 according to the embodiments includes a point cloud video acquirer 10001, a point cloud video encoder 10002, and/or a transmitter (or communication module) 10003.

The point cloud video acquirer 10001 according to the embodiments acquires a point cloud video through a processing process such as capture, synthesis, or generation. The point cloud video is point cloud content represented by a point cloud, which is a set of points positioned in a 3D space, and may be referred to as point cloud video data. The point cloud video according to the embodiments may include one or more frames. One frame represents a still image/picture. Therefore, the point cloud video may include a point cloud image/frame/picture, and may be referred to as a point cloud image, frame, or picture.

The point cloud video encoder 10002 according to the embodiments encodes the acquired point cloud video data. The point cloud video encoder 10002 may encode the point cloud video data based on point cloud compression coding. The point cloud compression coding according to the embodiments may include geometry-based point cloud compression (G-PCC) coding and/or video-based point cloud compression (V-PCC) coding or next-generation coding. The point cloud compression coding according to the embodiments is not limited to the above-described embodiment. The point cloud video encoder 10002 may output a bitstream containing the encoded point cloud video data. The bitstream may contain not only the encoded point cloud video data, but also signaling information related to encoding of the point cloud video data.

The transmitter 10003 according to the embodiments transmits the bitstream containing the encoded point cloud video data. The bitstream according to the embodiments is encapsulated in a file or segment (for example, a streaming segment), and is transmitted over various networks such as a broadcasting network and/or a broadband network. Although not shown in the figure, the transmission device 10000 may include an encapsulator (or an encapsulation module) configured to perform an encapsulation operation. According to embodiments, the encapsulator may be included in the transmitter 10003. According to embodiments, the file or segment may be transmitted to the reception device 10004 over a network, or stored in a digital storage medium (e.g., USB, SD, CD, DVD, Blu-ray, HDD, SSD, etc.). The transmitter 10003 according to the embodiments is capable of wired/wireless communication with the reception device 10004 (or the receiver 10005) over a network of 4G, 5G, 6G, etc. In addition, the transmitter may perform a necessary data processing operation according to the network system (e.g., a 4G, 5G or 6G communication network system). The transmission device 10000 may transmit the encapsulated data in an on-demand manner.

The reception device 10004 according to the embodiments includes a receiver 10005, a point cloud video decoder 10006, and/or a renderer 10007. According to embodiments, the reception device 10004 may include a device, a robot, a vehicle, an AR/VR/XR device, a portable device, a home appliance, an Internet of Things (IoT) device, and an AI device/server which are configured to perform communication with a base station and/or other wireless devices using a radio access technology (e.g., 5G New RAT (NR), Long Term Evolution (LTE)).

The receiver 10005 according to the embodiments receives the bitstream containing the point cloud video data or the file/segment in which the bitstream is encapsulated from the network or storage medium. The receiver 10005 may perform necessary data processing according to the network system (for example, a communication network system of 4G, 5G, 6G, etc.). The receiver 10005 according to the embodiments may decapsulate the received file/segment and output a bitstream. According to embodiments, the receiver 10005 may include a decapsulator (or a decapsulation module) configured to perform a decapsulation operation. The decapsulator may be implemented as an element (or component) separate from the receiver 10005.

The point cloud video decoder 10006 decodes the bitstream containing the point cloud video data. The point cloud video decoder 10006 may decode the point cloud video data according to the method by which the point cloud video data is encoded (for example, in a reverse process of the operation of the point cloud video encoder 10002). Accordingly, the point cloud video decoder 10006 may decode the point cloud video data by performing point cloud decompression coding, which is the inverse process of the point cloud compression. The point cloud decompression coding includes G-PCC coding.

The renderer 10007 renders the decoded point cloud video data. The renderer 10007 may output point cloud content by rendering not only the point cloud video data but also audio data. According to embodiments, the renderer 10007 may include a display configured to display the point cloud content. According to embodiments, the display may be implemented as a separate device or component rather than being included in the renderer 10007.

The arrows indicated by dotted lines in the drawing represent a transmission path of feedback information acquired by the reception device 10004. The feedback information is information for reflecting interactivity with a user who consumes the point cloud content, and includes information about the user (e.g., head orientation information, viewport information, and the like). In particular, when the point cloud content is content for a service (e.g., self-driving service, etc.) that requires interaction with the user, the feedback information may be provided to the content transmitting side (e.g., the transmission device 10000) and/or the service provider. According to embodiments, the feedback information may be used in the reception device 10004 as well as the transmission device 10000, or may not be provided.

The head orientation information according to embodiments is information about the user's head position, orientation, angle, motion, and the like. The reception device 10004 according to the embodiments may calculate the viewport information based on the head orientation information. The viewport information may be information about a region of a point cloud video that the user is viewing. A viewpoint is a point through which the user is viewing the point cloud video, and may refer to a center point of the viewport region. That is, the viewport is a region centered on the viewpoint, and the size and shape of the region may be determined by a field of view (FOV). Accordingly, the reception device 10004 may extract the viewport information based on a vertical or horizontal FOV supported by the device in addition to the head orientation information. Also, the reception device 10004 performs gaze analysis or the like to check the way the user consumes a point cloud, a region that the user gazes at in the point cloud video, a gaze time, and the like. According to embodiments, the reception device 10004 may transmit feedback information including the result of the gaze analysis to the transmission device 10000. The feedback information according to the embodiments may be acquired in the rendering and/or display process. The feedback information according to the embodiments may be secured by one or more sensors included in the reception device 10004. According to embodiments, the feedback information may be secured by the renderer 10007 or a separate external element (or device, component, or the like). The dotted lines in FIG. 1 represent a process of transmitting the feedback information secured by the renderer 10007. The point cloud content providing system may process (encode/decode) point cloud data based on the feedback information. Accordingly, the point cloud video data decoder 10006 may perform a decoding operation based on the feedback information. The reception device 10004 may transmit the feedback information to the transmission device 10000. The transmission device 10000 (or the point cloud video data encoder 10002) may perform an encoding operation based on the feedback information. Accordingly, the point cloud content providing system may efficiently process necessary data (e.g., point cloud data corresponding to the user's head position) based on the feedback information rather than processing (encoding/decoding) the entire point cloud data, and provide point cloud content to the user.

According to embodiments, the transmission device 10000 may be called an encoder, a transmission device, a transmitter, or the like, and the reception device 10004 may be called a decoder, a receiving device, a receiver, or the like.

The point cloud data processed in the point cloud content providing system of FIG. 1 according to embodiments (through a series of processes of acquisition/encoding/transmission/decoding/rendering) may be referred to as point cloud content data or point cloud video data. According to embodiments, the point cloud content data may be used as a concept covering metadata or signaling information related to the point cloud data.

The elements of the point cloud content providing system illustrated in FIG. 1 may be implemented by hardware, software, a processor, and/or a combination thereof.

Figure 2:
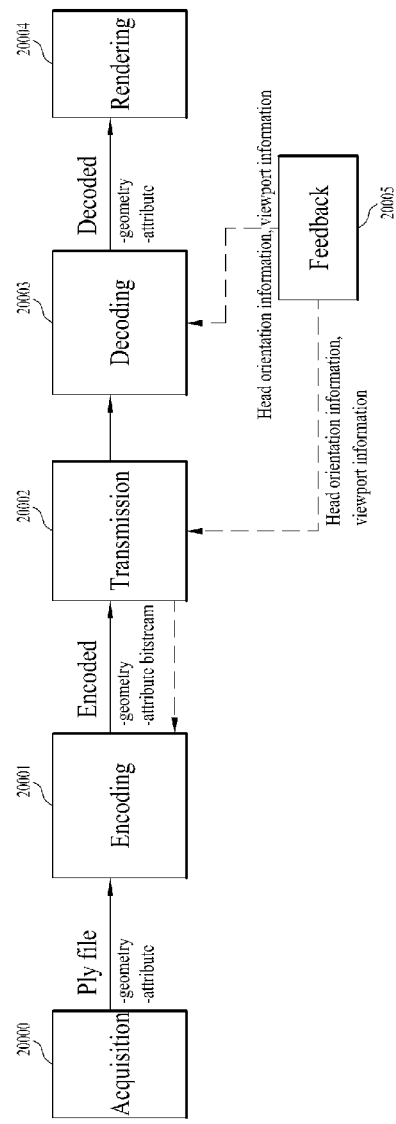
FIG. 2 is a block diagram illustrating a point cloud content providing operation according to embodiments.

FIG. 2 is a block diagram illustrating a point cloud content providing operation according to embodiments.

The block diagram of FIG. 2 shows the operation of the point cloud content providing system described in FIG. 1. As described above, the point cloud content providing system may process point cloud data based on point cloud compression coding (e.g., G-PCC).

The point cloud content providing system according to the embodiments (for example, the point cloud transmission device 10000 or the point cloud video acquirer 10001) may acquire a point cloud video (20000). The point cloud video is represented by a point cloud belonging to a coordinate system for expressing a 3D space. The point cloud video according to the embodiments may include a Ply (Polygon File format or the Stanford Triangle format) file. When the point cloud video has one or more frames, the acquired point cloud video may include one or more Ply files. The Ply files contain point cloud data, such as point geometry and/or attributes. The geometry includes positions of points. The position of each point may be represented by parameters (for example, values of the X, Y, and Z axes) representing a three-dimensional coordinate system (e.g., a coordinate system composed of X, Y and Z axes). The attributes include attributes of points (e.g., information about texture, color (in YCbCr or RGB), reflectance r, transparency, etc. of each point). A point has one or more attributes. For example, a point may have an attribute that is a color, or two attributes that are color and reflectance. According to embodiments, the geometry may be called positions, geometry information, geometry data, or the like, and the attribute may be called attributes, attribute information, attribute data, or the like. The point cloud content providing system (for example, the point cloud transmission device 10000 or the point cloud video acquirer 10001) may secure point cloud data from information (e.g., depth information, color information, etc.) related to the acquisition process of the point cloud video.

The point cloud content providing system (for example, the transmission device 10000 or the point cloud video encoder 10002) according to the embodiments may encode the point cloud data (20001). The point cloud content providing system may encode the point cloud data based on point cloud compression coding. As described above, the point cloud data may include the geometry and attributes of a point. Accordingly, the point cloud content providing system may perform geometry encoding of encoding the geometry and output a geometry bitstream. The point cloud content providing system may perform attribute encoding of encoding attributes and output an attribute bitstream. According to embodiments, the point cloud content providing system may perform the attribute encoding based on the geometry encoding. The geometry bitstream and the attribute bitstream according to the embodiments may be multiplexed and output as one bitstream. The bitstream according to the embodiments may further contain signaling information related to the geometry encoding and attribute encoding.

The point cloud content providing system (for example, the transmission device 10000 or the transmitter 10003) according to the embodiments may transmit the encoded point cloud data (20002). As illustrated in FIG. 1, the encoded point cloud data may be represented by a geometry bitstream and an attribute bitstream. In addition, the encoded point cloud data may be transmitted in the form of a bitstream together with signaling information related to encoding of the point cloud data (for example, signaling information related to the geometry encoding and the attribute encoding). The point cloud content providing system may encapsulate a bitstream that carries the encoded point cloud data and transmit the same in the form of a file or segment.

The point cloud content providing system (for example, the reception device 10004 or the receiver 10005) according to the embodiments may receive the bitstream containing the encoded point cloud data. In addition, the point cloud content providing system (for example, the reception device 10004 or the receiver 10005) may demultiplex the bitstream.

The point cloud content providing system (e.g., the reception device 10004 or the point cloud video decoder 10005) may decode the encoded point cloud data (e.g., the geometry bitstream, the attribute bitstream) transmitted in the bitstream. The point cloud content providing system (for example, the reception device 10004 or the point cloud video decoder 10005) may decode the point cloud video data based on the signaling information related to encoding of the point cloud video data contained in the bitstream. The point cloud content providing system (for example, the reception device 10004 or the point cloud video decoder 10005) may decode the geometry bitstream to reconstruct the positions (geometry) of points. The point cloud content providing system may reconstruct the attributes of the points by decoding the attribute bitstream based on the reconstructed geometry. The point cloud content providing system (for example, the reception device 10004 or the point cloud video decoder 10005) may reconstruct the point cloud video based on the positions according to the reconstructed geometry and the decoded attributes.

The point cloud content providing system according to the embodiments (for example, the reception device 10004 or the renderer 10007) may render the decoded point cloud data (20004). The point cloud content providing system (for example, the reception device 10004 or the renderer 10007) may render the geometry and attributes decoded through the decoding process, using various rendering methods. Points in the point cloud content may be rendered to a vertex having a certain thickness, a cube having a specific minimum size centered on the corresponding vertex position, or a circle centered on the corresponding vertex position. All or part of the rendered point cloud content is provided to the user through a display (e.g., a VR/AR display, a general display, etc.).

The point cloud content providing system (for example, the reception device 10004) according to the embodiments may secure feedback information (20005). The point cloud content providing system may encode and/or decode point cloud data based on the feedback information. The feedback information and the operation of the point cloud content providing system according to the embodiments are the same as the feedback information and the operation described with reference to FIG. 1, and thus detailed description thereof is omitted.

Figure 3:
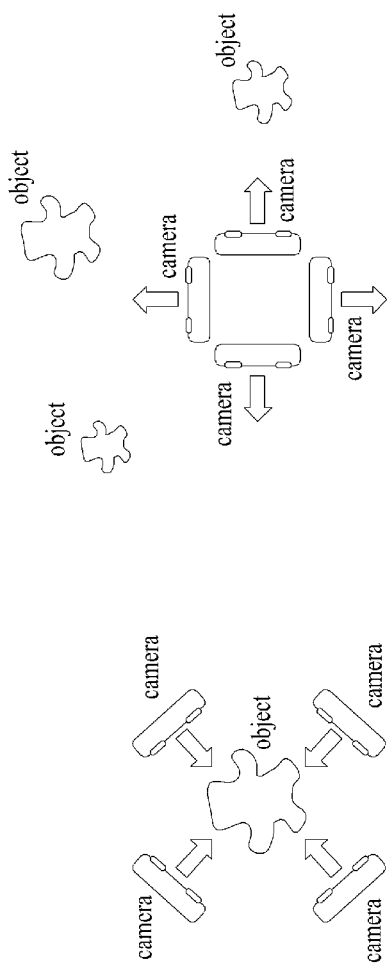
FIG. 3 illustrates an exemplary process of capturing a point cloud video according to embodiments.

FIG. 3 illustrates an exemplary process of capturing a point cloud video according to embodiments.

FIG. 3 illustrates an exemplary point cloud video capture process of the point cloud content providing system described with reference to FIGS. 1 to 2.

Point cloud content includes a point cloud video (images and/or videos) representing an object and/or environment located in various 3D spaces (e.g., a 3D space representing a real environment, a 3D space representing a virtual environment, etc.). Accordingly, the point cloud content providing system according to the embodiments may capture a point cloud video using one or more cameras (e.g., an infrared camera capable of securing depth information, an RGB camera capable of extracting color information corresponding to the depth information, etc.), a projector (e.g., an infrared pattern projector to secure depth information), a LiDAR, or the like. The point cloud content providing system according to the embodiments may extract the shape of geometry composed of points in a 3D space from the depth information and extract the attributes of each point from the color information to secure point cloud data. An image and/or video according to the embodiments may be captured based on at least one of the inward-facing technique and the outward-facing technique.

The left part of FIG. 3 illustrates the inward-facing technique. The inward-facing technique refers to a technique of capturing images a central object with one or more cameras (or camera sensors) positioned around the central object. The inward-facing technique may be used to generate point cloud content providing a 360-degree image of a key object to the user (e.g., VR/AR content providing a 360-degree image of an object (e.g., a key object such as a character, player, object, or actor) to the user).

The right part of FIG. 3 illustrates the outward-facing technique. The outward-facing technique refers to a technique of capturing images an environment of a central object rather than the central object with one or more cameras (or camera sensors) positioned around the central object. The outward-facing technique may be used to generate point cloud content for providing a surrounding environment that appears from the user's point of view (e.g., content representing an external environment that may be provided to a user of a self-driving vehicle).

As shown in the figure, the point cloud content may be generated based on the capturing operation of one or more cameras. In this case, the coordinate system may differ among the cameras, and accordingly the point cloud content providing system may calibrate one or more cameras to set a global coordinate system before the capturing operation. In addition, the point cloud content providing system may generate point cloud content by synthesizing an arbitrary image and/or video with an image and/or video captured by the above-described capture technique. The point cloud content providing system may not perform the capturing operation described in FIG. 3 when it generates point cloud content representing a virtual space. The point cloud content providing system according to the embodiments may perform post-processing on the captured image and/or video. In other words, the point cloud content providing system may remove an unwanted area (for example, a background), recognize a space to which the captured images and/or videos are connected, and, when there is a spatial hole, perform an operation of filling the spatial hole.

The point cloud content providing system may generate one piece of point cloud content by performing coordinate transformation on points of the point cloud video secured from each camera. The point cloud content providing system may perform coordinate transformation on the points based on the coordinates of the position of each camera. Accordingly, the point cloud content providing system may generate content representing one wide range, or may generate point cloud content having a high density of points.

Figure 4:
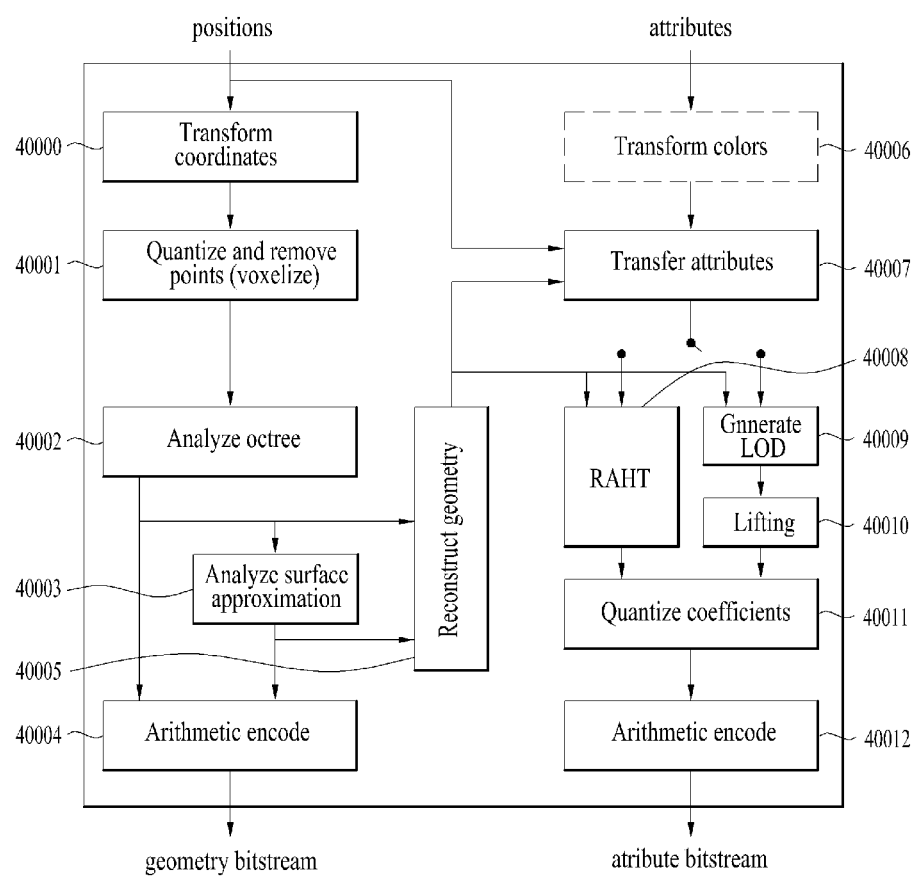
FIG. 4 illustrates an exemplary point cloud encoder according to embodiments.

FIG. 4 illustrates an exemplary point cloud encoder according to embodiments.

FIG. 4 shows an example of the point cloud video encoder 10002 of FIG. 1. The point cloud encoder reconstructs and encodes point cloud data (e.g., positions and/or attributes of the points) to adjust the quality of the point cloud content (to, for example, lossless, lossy, or near-lossless) according to the network condition or applications. When the overall size of the point cloud content is large (e.g., point cloud content of 60 Gbps is given for 30 fps), the point cloud content providing system may fail to stream the content in real time. Accordingly, the point cloud content providing system may reconstruct the point cloud content based on the maximum target bitrate to provide the same in accordance with the network environment or the like.

As described with reference to FIGS. 1 and 2, the point cloud encoder may perform geometry encoding and attribute encoding. The geometry encoding is performed before the attribute encoding.

The point cloud encoder according to the embodiments includes a coordinate transformer (Transform coordinates) 40000, a quantizer (Quantize and remove points (voxelize)) 40001, an octree analyzer (Analyze octree) 40002, and a surface approximation analyzer (Analyze surface approximation) 40003, an arithmetic encoder (Arithmetic encode) 40004, a geometry reconstructor (Reconstruct geometry) 40005, a color transformer (Transform colors) 40006, an attribute transformer (Transform attributes) 40007, a RAHT transformer (RAHT) 40008, an LOD generator (Generate LOD) 40009, a lifting transformer (Lifting) 40010, a coefficient quantizer (Quantize coefficients) 40011, and/or an arithmetic encoder (Arithmetic encode) 40012.

The coordinate transformer 40000, the quantizer 40001, the octree analyzer 40002, the surface approximation analyzer 40003, the arithmetic encoder 40004, and the geometry reconstructor 40005 may perform geometry encoding. The geometry encoding according to the embodiments may include octree geometry coding, direct coding, trisoup geometry encoding, and entropy encoding. The direct coding and trisoup geometry encoding are applied selectively or in combination. The geometry encoding is not limited to the above-described example.

As shown in the figure, the coordinate transformer 40000 according to the embodiments receives positions and transforms the same into coordinates. For example, the positions may be transformed into position information in a three-dimensional space (for example, a three-dimensional space represented by an XYZ coordinate system). The position information in the three-dimensional space according to the embodiments may be referred to as geometry information.

The quantizer 40001 according to the embodiments quantizes the geometry. For example, the quantizer 40001 may quantize the points based on a minimum position value of all points (for example, a minimum value on each of the X, Y, and Z axes). The quantizer 40001 performs a quantization operation of multiplying the difference between the minimum position value and the position value of each point by a preset quantization scale value and then finding the nearest integer value by rounding the value obtained through the multiplication. Thus, one or more points may have the same quantized position (or position value). The quantizer 40001 according to the embodiments performs voxelization based on the quantized positions to reconstruct quantized points. As in the case of a pixel, which is the minimum unit containing 2D image/video information, points of point cloud content (or 3D point cloud video) according to the embodiments may be included in one or more voxels. The term voxel, which is a compound of volume and pixel, refers to a 3D cubic space generated when a 3D space is divided into units (unit=1.0) based on the axes representing the 3D space (e.g., X-axis, Y-axis, and Z-axis). The quantizer 40001 may match groups of points in the 3D space with voxels. According to embodiments, one voxel may include only one point. According to embodiments, one voxel may include one or more points. In order to express one voxel as one point, the position of the center of a voxel may be set based on the positions of one or more points included in the voxel. In this case, attributes of all positions included in one voxel may be combined and assigned to the voxel.

The octree analyzer 40002 according to the embodiments performs octree geometry coding (or octree coding) to present voxels in an octree structure. The octree structure represents points matched with voxels, based on the octal tree structure.

The surface approximation analyzer 40003 according to the embodiments may analyze and approximate the octree. The octree analysis and approximation according to the embodiments is a process of analyzing a region containing a plurality of points to efficiently provide octree and voxelization.

The arithmetic encoder 40004 according to the embodiments performs entropy encoding on the octree and/or the approximated octree. For example, the encoding scheme includes arithmetic encoding. As a result of the encoding, a geometry bitstream is generated.

The color transformer 40006, the attribute transformer 40007, the RAHT transformer 40008, the LOD generator 40009, the lifting transformer 40010, the coefficient quantizer 40011, and/or the arithmetic encoder 40012 perform attribute encoding. As described above, one point may have one or more attributes. The attribute encoding according to the embodiments is equally applied to the attributes that one point has. However, when an attribute (e.g., color) includes one or more elements, attribute encoding is independently applied to each element. The attribute encoding according to the embodiments includes color transform coding, attribute transform coding, region adaptive hierarchical transform (RAHT) coding, interpolation-based hierarchical nearest-neighbor prediction (prediction transform) coding, and interpolation-based hierarchical nearest-neighbor prediction with an update/lifting step (lifting transform) coding. Depending on the point cloud content, the RAHT coding, the prediction transform coding and the lifting transform coding described above may be selectively used, or a combination of one or more of the coding schemes may be used. The attribute encoding according to the embodiments is not limited to the above-described example.

The color transformer 40006 according to the embodiments performs color transform coding of transforming color values (or textures) included in the attributes. For example, the color transformer 40006 may transform the format of color information (for example, from RGB to YCbCr). The operation of the color transformer 40006 according to embodiments may be optionally applied according to the color values included in the attributes.

The geometry reconstructor 40005 according to the embodiments reconstructs (decompresses) the octree and/or the approximated octree. The geometry reconstructor 40005 reconstructs the octree/voxels based on the result of analyzing the distribution of points. The reconstructed octree/voxels may be referred to as reconstructed geometry (restored geometry).

The attribute transformer 40007 according to the embodiments performs attribute transformation to transform the attributes based on the reconstructed geometry and/or the positions on which geometry encoding is not performed. As described above, since the attributes are dependent on the geometry, the attribute transformer 40007 may transform the attributes based on the reconstructed geometry information. For example, based on the position value of a point included in a voxel, the attribute transformer 40007 may transform the attribute of the point at the position. As described above, when the position of the center of a voxel is set based on the positions of one or more points included in the voxel, the attribute transformer 40007 transforms the attributes of the one or more points. When the trisoup geometry encoding is performed, the attribute transformer 40007 may transform the attributes based on the trisoup geometry encoding.

The attribute transformer 40007 may perform the attribute transformation by calculating the average of attributes or attribute values of neighboring points (e.g., color or reflectance of each point) within a specific position/radius from the position (or position value) of the center of each voxel. The attribute transformer 40007 may apply a weight according to the distance from the center to each point in calculating the average. Accordingly, each voxel has a position and a calculated attribute (or attribute value).

The attribute transformer 40007 may search for neighboring points existing within a specific position/radius from the position of the center of each voxel based on the K-D tree or the Morton code. The K-D tree is a binary search tree and supports a data structure capable of managing points based on the positions such that nearest neighbor search (NNS) can be performed quickly. The Morton code is generated by presenting coordinates (e.g., (x, y, z)) representing 3D positions of all points as bit values and mixing the bits. For example, when the coordinates representing the position of a point are (5, 9, 1), the bit values for the coordinates are (0101, 1001, 0001). Mixing the bit values according to the bit index in order of z, y, and x yields 010001000111. This value is expressed as a decimal number of 1095. That is, the Morton code value of the point having coordinates (5, 9, 1) is 1095. The attribute transformer 40007 may order the points based on the Morton code values and perform NNS through a depth-first traversal process. After the attribute transformation operation, the K-D tree or the Morton code is used when the NNS is needed in another transformation process for attribute coding.

As shown in the figure, the transformed attributes are input to the RAHT transformer 40008 and/or the LOD generator 40009.

The RAHT transformer 40008 according to the embodiments performs RAHT coding for predicting attribute information based on the reconstructed geometry information. For example, the RAHT transformer 40008 may predict attribute information of a node at a higher level in the octree based on the attribute information associated with a node at a lower level in the octree.

The LOD generator 40009 according to the embodiments generates a level of detail (LOD) to perform prediction transform coding. The LOD according to the embodiments is a degree of detail of point cloud content. As the LOD value decrease, it indicates that the detail of the point cloud content is degraded. As the LOD value increases, it indicates that the detail of the point cloud content is enhanced. Points may be classified by the LOD.

The lifting transformer 40010 according to the embodiments performs lifting transform coding of transforming the attributes a point cloud based on weights. As described above, lifting transform coding may be optionally applied.

The coefficient quantizer 40011 according to the embodiments quantizes the attribute-coded attributes based on coefficients.

The arithmetic encoder 40012 according to the embodiments encodes the quantized attributes based on arithmetic coding.

Although not shown in the figure, the elements of the point cloud encoder of FIG. 4 may be implemented by hardware including one or more processors or integrated circuits configured to communicate with one or more memories included in the point cloud providing device, software, firmware, or a combination thereof. The one or more processors may perform at least one of the operations and/or functions of the elements of the point cloud encoder of FIG. 4 described above. Additionally, the one or more processors may operate or execute a set of software programs and/or instructions for performing the operations and/or functions of the elements of the point cloud encoder of FIG. 4. The one or more memories according to the embodiments may include a high speed random access memory, or include a non-volatile memory (e.g., one or more magnetic disk storage devices, flash memory devices, or other non-volatile solid-state memory devices).

Figure 5:
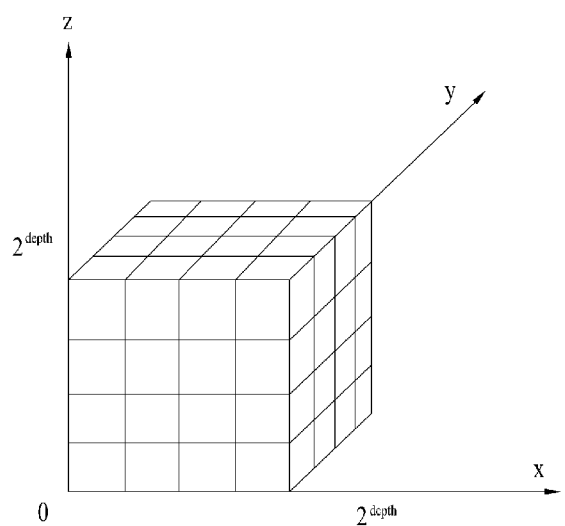
FIG. 5 shows an example of voxels according to embodiments.

FIG. 5 shows an example of voxels according to embodiments.

FIG. 5 shows voxels positioned in a 3D space represented by a coordinate system composed of three axes, which are the X-axis, the Y-axis, and the Z-axis. As described with reference to FIG. 4, the point cloud encoder (e.g., the quantizer 40001) may perform voxelization. Voxel refers to a 3D cubic space generated when a 3D space is divided into units (unit=1.0) based on the axes representing the 3D space (e.g., X-axis, Y-axis, and Z-axis). FIG. 5 shows an example of voxels generated through an octree structure in which a cubical axis-aligned bounding box defined by two poles (0, 0, 0) and (2d, 2d, 2d) is recursively subdivided. One voxel includes at least one point. The spatial coordinates of a voxel may be estimated from the positional relationship with a voxel group. As described above, a voxel has an attribute (such as color or reflectance) like pixels of a 2D image/video. The details of the voxel are the same as those described with reference to FIG. 4, and therefore a description thereof is omitted.

FIG. 6 shows an example of an octree and occupancy code according to embodiments.

As described with reference to FIGS. 1 to 4, the point cloud content providing system (point cloud video encoder 10002) or the point cloud encoder (for example, the octree analyzer 40002) performs octree geometry coding (or octree coding) based on an octree structure to efficiently manage the region and/or position of the voxel.

The upper part of FIG. 6 shows an octree structure. The 3D space of the point cloud content according to the embodiments is represented by axes (e.g., X-axis, Y-axis, and Z-axis) of the coordinate system. The octree structure is created by recursive subdividing of a cubical axis-aligned bounding box defined by two poles (0, 0, 0) and $(2^d, 2^d, 2^d)$. Here, $2^d$ may be set to a value constituting the smallest bounding box surrounding all points of the point cloud content (or point cloud video). Here, d denotes the depth of the octree. The value of d is determined in the following equation. In the following equation, $(x^{int}_n, y^{int}_n, z^{int}_n)$ denotes the positions (or position values) of quantized points.

$$d=\text{Ceil}(\text{Log } 2(\text{Max}(x_n^{int}, y_n^{int}, z_n^{int}, n=1, \ldots, N)+1))$$

As shown in the middle of the upper part of FIG. 6, the entire 3D space may be divided into eight spaces according to partition. Each divided space is represented by a cube with six faces. As shown in the upper right of FIG. 6, each of the eight spaces is divided again based on the axes of the coordinate system (e.g., X-axis, Y-axis, and Z-axis). Accordingly, each space is divided into eight smaller spaces. The divided smaller space is also represented by a cube with six faces. This partitioning scheme is applied until the leaf node of the octree becomes a voxel.

The lower part of FIG. 6 shows an octree occupancy code. The occupancy code of the octree is generated to indicate whether each of the eight divided spaces generated by dividing one space contains at least one point. Accordingly, a single occupancy code is represented by eight child nodes. Each child node represents the occupancy of a divided space, and the child node has a value in 1 bit. Accordingly, the occupancy code is represented as an 8-bit code. That is, when at least one point is contained in the space corresponding to a child node, the node is assigned a value of 1. When no point is contained in the space corresponding to the child node (the space is empty), the node is assigned a value of 0. Since the occupancy code shown in FIG. 6 is 00100001, it indicates that the spaces corresponding to the third child node and the eighth child node among the eight child nodes each contain at least one point. As shown in the figure, each of the third child node and the eighth child node has eight child nodes, and the child nodes are represented by an 8-bit occupancy code. The figure shows that the occupancy code of the third child node is 10000111, and the occupancy code of the eighth child node is 01001111. The point cloud encoder (for example, the arithmetic encoder 40004) according to the embodiments may perform entropy encoding on the occupancy codes. In order to increase the compression efficiency, the point cloud encoder may perform intra/inter-coding on the occupancy codes. The reception device (for example, the reception device 10004 or the point cloud video decoder 10006) according to the embodiments reconstructs the octree based on the occupancy codes.

The point cloud encoder (for example, the point cloud encoder of FIG. 4 or the octree analyzer 40002) according to the embodiments may perform voxelization and octree coding to store the positions of points. However, points are not always evenly distributed in the 3D space, and accordingly there may be a specific region in which fewer points are present. Accordingly, it is inefficient to perform voxelization for the entire 3D space. For example, when a specific region contains few points, voxelization does not need to be performed in the specific region.

Accordingly, for the above-described specific region (or a node other than the leaf node of the octree), the point cloud encoder according to the embodiments may skip voxelization and perform direct coding to directly code the positions of points included in the specific region. The coordinates of a direct coding point according to the embodiments are referred to as direct coding mode (DCM). The point cloud encoder according to the embodiments may also perform trisoup geometry encoding, which is to reconstruct the positions of the points in the specific region (or node) based on voxels, based on a surface model. The trisoup geometry encoding is geometry encoding that represents an object as a series of triangular meshes. Accordingly, the point cloud decoder may generate a point cloud from the mesh surface. The direct coding and trisoup geometry encoding according to the embodiments may be selectively performed. In addition, the direct coding and trisoup geometry encoding according to the embodiments may be performed in combination with octree geometry coding (or octree coding).

To perform direct coding, the option to use the direct mode for applying direct coding should be activated. A node to which direct coding is to be applied is not a leaf node, and points less than a threshold should be present within a specific node. In addition, the total number of points to which direct coding is to be applied should not exceed a preset threshold. When the conditions above are satisfied, the point cloud encoder (or the arithmetic encoder 40004) according to the embodiments may perform entropy coding on the positions (or position values) of the points.

The point cloud encoder (for example, the surface approximation analyzer 40003) according to the embodiments may determine a specific level of the octree (a level less than the depth d of the octree), and the surface model may be used staring with that level to perform trisoup geometry encoding to reconstruct the positions of points in the region of the node based on voxels (Trisoup mode). The point cloud encoder according to the embodiments may specify a level at which trisoup geometry encoding is to be applied. For example, when the specific level is equal to the depth of the octree, the point cloud encoder does not operate in the trisoup mode. In other words, the point cloud encoder according to the embodiments may operate in the trisoup mode only when the specified level is less than the value of depth of the octree. The 3D cube region of the nodes at the specified level according to the embodiments is called a block. One block may include one or more voxels. The block or voxel may correspond to a brick. Geometry is represented as a surface within each block. The surface according to embodiments may intersect with each edge of a block at most once.

One block has 12 edges, and accordingly there are at least 12 intersections in one block. Each intersection is called a vertex (or apex). A vertex present along an edge is detected when there is at least one occupied voxel adjacent to the edge among all blocks sharing the edge. The occupied voxel according to the embodiments refers to a voxel containing a point. The position of the vertex detected along the edge is the average position along the edge of all voxels adjacent to the edge among all blocks sharing the edge.

Once the vertex is detected, the point cloud encoder according to the embodiments may perform entropy encoding on the starting point (x, y, z) of the edge, the direction vector (Δx, Δy, Δz) of the edge, and the vertex position value (relative position value within the edge). When the trisoup geometry encoding is applied, the point cloud encoder according to the embodiments (for example, the geometry reconstructor 40005) may generate restored geometry (reconstructed geometry) by performing the triangle reconstruction, up-sampling, and voxelization processes.

The vertices positioned at the edge of the block determine a surface that passes through the block. The surface according to the embodiments is a non-planar polygon. In the triangle reconstruction process, a surface represented by a triangle is reconstructed based on the starting point of the edge, the direction vector of the edge, and the position values of the vertices. The triangle reconstruction process is performed by: 1) calculating the centroid value of each vertex, 2) subtracting the center value from each vertex value, and 3) estimating the sum of the squares of the values obtained by the subtraction.

$$\begin{bmatrix} \mu_x \\ \mu_y \\ \mu_z \end{bmatrix} = \frac{1}{n}\sum_{i=1}^{n}\begin{bmatrix} x_i \\ y_i \\ z_i \end{bmatrix} \quad 1)$$

$$\begin{bmatrix} \overline{x}_i \\ \overline{y}_i \\ \overline{z}_i \end{bmatrix} = \begin{bmatrix} x_i \\ y_i \\ z_i \end{bmatrix} - \begin{bmatrix} \mu_x \\ \mu_y \\ \mu_z \end{bmatrix} \quad 2)$$

$$\begin{bmatrix} \sigma_x^2 \\ \sigma_y^2 \\ \sigma_z^2 \end{bmatrix} = \sum_{i=1}^{n}\begin{bmatrix} \overline{x}_i^2 \\ \overline{y}_i^2 \\ \overline{z}_i^2 \end{bmatrix} \quad 3)$$

The minimum value of the sum is estimated, and the projection process is performed according to the axis with the minimum value. For example, when the element x is the minimum, each vertex is projected on the x-axis with respect to the center of the block, and projected on the (y, z) plane. When the values obtained through projection on the (y, z) plane are (ai, bi), the value of θ is estimated through a tan 2(bi, ai), and the vertices are ordered based on the value of θ. The table below shows a combination of vertices for creating a triangle according to the number of the vertices. The vertices are ordered from 1 to n. The table below shows that for four vertices, two triangles may be constructed according to combinations of vertices. The first triangle may consist of vertices 1, 2, and 3 among the ordered vertices, and the second triangle may consist of vertices 3, 4, and 1 among the ordered vertices.

TABLE Triangles formed from vertices ordered 1

TABLE 1

| n | Triangles |
|---|---|
| 3 | (1, 2, 3) |
| 4 | (1, 2, 3), (3, 4, 1) |
| 5 | (1, 2, 3), (3, 4, 5), (5, 1, 3) |
| 6 | (1, 2, 3), (3, 4, 5), (5, 6, 1), (1, 3, 5) |
| 7 | (1, 2, 3), (3, 4, 5), (5, 6, 7), (7, 1, 3), (3, 5, 7) |
| 8 | (1, 2, 3), (3, 4, 5), (5, 6, 7), (7, 8, 1), (1, 3, 5), (5, 7, 1) |

TABLE 1-continued

| n | Triangles |
|---|---|
| 9 | (1, 2, 3), (3, 4, 5), (5, 6, 7), (7, 8, 9), (9, 1, 3), (3, 5, 7), (7, 9, 3) |
| 10 | (1, 2, 3), (3, 4, 5), (5, 6, 7), (7, 8, 9), (9, 10, 1), (1, 3, 5), (5, 7, 9), (9, 1, 5) |
| 11 | (1, 2, 3), (3, 4, 5), (5, 6, 7), (7, 8, 9), (9, 10, 11), (11, 1, 3), (3, 5, 7), (7, 9, 11), (11, 3, 7) |
| 12 | (1, 2, 3), (3, 4, 5), (5, 6, 7), (7, 8, 9), (9, 10, 11), (11, 12, 1), (1, 3, 5), (5, 7, 9), (9, 11, 1), (1, 5, 9) |

The upsampling process is performed to add points in the middle along the edge of the triangle and perform voxelization. The added points are generated based on the upsampling factor and the width of the block. The added points are called refined vertices. The point cloud encoder according to the embodiments may voxelize the refined vertices. In addition, the point cloud encoder may perform attribute encoding based on the voxelized positions (or position values). FIG. 7 shows an example of a neighbor node pattern according to embodiments.

In order to increase the compression efficiency of the point cloud video, the point cloud encoder according to the embodiments may perform entropy coding based on context adaptive arithmetic coding.

As described with reference to FIGS. 1 to 6, the point cloud content providing system or the point cloud encoder (for example, the point cloud video encoder 10002, the point cloud encoder or arithmetic encoder 40004 of FIG. 4) may perform entropy coding on the occupancy code immediately. In addition, the point cloud content providing system or the point cloud encoder may perform entropy encoding (intra encoding) based on the occupancy code of the current node and the occupancy of neighboring nodes, or perform entropy encoding (inter encoding) based on the occupancy code of the previous frame. A frame according to embodiments represents a set of point cloud videos generated at the same time. The compression efficiency of intra encoding/inter encoding according to the embodiments may depend on the number of neighboring nodes that are referenced. When the bits increase, the operation becomes complicated, but the encoding may be biased to one side, which may increase the compression efficiency. For example, when a 3-bit context is given, coding needs to be performed using 2³=8 methods. The part divided for coding affects the complexity of implementation. Accordingly, it is necessary to meet an appropriate level of compression efficiency and complexity.

FIG. 7 illustrates a process of obtaining an occupancy pattern based on the occupancy of neighbor nodes. The point cloud encoder according to the embodiments determines occupancy of neighbor nodes of each node of the octree and obtains a value of a neighbor pattern. The neighbor node pattern is used to infer the occupancy pattern of the node. The left part of FIG. 7 shows a cube corresponding to a node (a cube positioned in the middle) and six cubes (neighbor nodes) sharing at least one face with the cube. The nodes shown in the figure are nodes of the same depth. The numbers shown in the figure represent weights (1, 2, 4, 8, 16, and 32) associated with the six nodes, respectively. The weights are assigned sequentially according to the positions of neighboring nodes.

The right part of FIG. 7 shows neighbor node pattern values. A neighbor node pattern value is the sum of values multiplied by the weight of an occupied neighbor node (a neighbor node having a point). Accordingly, the neighbor node pattern values are 0 to 63. When the neighbor node pattern value is 0, it indicates that there is no node having a point (no occupied node) among the neighbor nodes of the node. When the neighbor node pattern value is 63, it indicates that all neighbor nodes are occupied nodes. As shown in the figure, since neighbor nodes to which weights 1, 2, 4, and 8 are assigned are occupied nodes, the neighbor node pattern value is 15, the sum of 1, 2, 4, and 8. The point cloud encoder may perform coding according to the neighbor node pattern value (for example, when the neighbor node pattern value is 63, 64 kinds of coding may be performed). According to embodiments, the point cloud encoder may reduce coding complexity by changing a neighbor node pattern value (for example, based on a table by which 64 is changed to 10 or 6).

Figure 8:
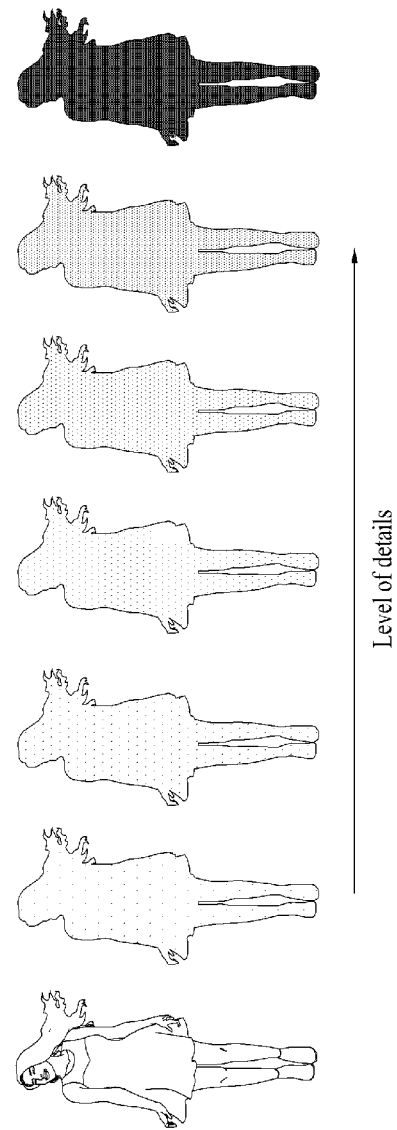
FIG. 8 illustrates an example of point configuration in each LOD according to embodiments.

FIG. 8 illustrates an example of point configuration in each LOD according to embodiments.

As described with reference to FIGS. 1 to 7, encoded geometry is reconstructed (decompressed) before attribute encoding is performed. When direct coding is applied, the geometry reconstruction operation may include changing the placement of direct coded points (e.g., placing the direct coded points in front of the point cloud data). When trisoup geometry encoding is applied, the geometry reconstruction process is performed through triangle reconstruction, up-sampling, and voxelization. Since the attribute depends on the geometry, attribute encoding is performed based on the reconstructed geometry.

The point cloud encoder (for example, the LOD generator 40009) may classify (reorganize) points by LOD. The figure shows the point cloud content corresponding to LODs. The leftmost picture in the figure represents original point cloud content. The second picture from the left of the figure represents distribution of the points in the lowest LOD, and the rightmost picture in the figure represents distribution of the points in the highest LOD. That is, the points in the lowest LOD are sparsely distributed, and the points in the highest LOD are densely distributed. That is, as the LOD rises in the direction pointed by the arrow indicated at the bottom of the figure, the space (or distance) between points is narrowed.

Figure 9:
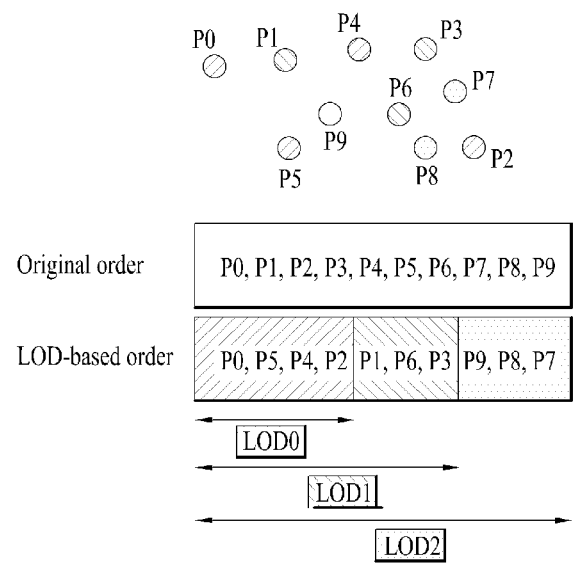
FIG. 9 illustrates an example of point configuration in each LOD according to embodiments.

FIG. 9 illustrates an example of point configuration for each LOD according to embodiments.

As described with reference to FIGS. 1 to 8, the point cloud content providing system, or the point cloud encoder (for example, the point cloud video encoder 10002, the point cloud encoder of FIG. 4, or the LOD generator 40009) may generates an LOD. The LOD is generated by reorganizing the points into a set of refinement levels according to a set LOD distance value (or a set of Euclidean distances). The LOD generation process is performed not only by the point cloud encoder, but also by the point cloud decoder.

The upper part of FIG. 9 shows examples (P0 to P9) of points of the point cloud content distributed in a 3D space. In FIG. 9, the original order represents the order of points P0 to P9 before LOD generation. In FIG. 9, the LOD based order represents the order of points according to the LOD generation. Points are reorganized by LOD. Also, a high LOD contains the points belonging to lower LODs. As shown in FIG. 9, LOD0 contains P0, P5, P4 and P2. LOD1 contains the points of LOD0, P1, P6 and P3. LOD2 contains the points of LOD0, the points of LOD1, P9, P8 and P7.

As described with reference to FIG. 4, the point cloud encoder according to the embodiments may perform prediction transform coding, lifting transform coding, and RAHT transform coding selectively or in combination.

The point cloud encoder according to the embodiments may generate a predictor for points to perform prediction transform coding for setting a predicted attribute (or predicted attribute value) of each point. That is, N predictors may be generated for N points. The predictor according to the embodiments may calculate a weight (=1/distance) based on the LOD value of each point, indexing information about neighboring points present within a set distance for each LOD, and a distance to the neighboring points.

The predicted attribute (or attribute value) according to the embodiments is set to the average of values obtained by multiplying the attributes (or attribute values) (e.g., color, reflectance, etc.) of neighbor points set in the predictor of each point by a weight (or weight value) calculated based on the distance to each neighbor point. The point cloud encoder according to the embodiments (for example, the coefficient quantizer 40011) may quantize and inversely quantize the residuals (which may be called residual attributes, residual attribute values, or attribute prediction residuals) obtained by subtracting a predicted attribute (attribute value) from the attribute (attribute value) of each point. The quantization process is configured as shown in the following table.

Attribute Prediction Residuals Quantization Pseudo Code

TABLE 2

```
int PCCQuantization(int value, int quantStep) {
    if( value >=0) {
        return floor(value / quantStep + 1.0 / 3.0);
    } else {
        return -floor(-value / quantStep + 1.0 / 3.0);
    }
}
```

Attribute Prediction Residuals Inverse Quantization Pseudo Code

TABLE 3

```
int PCCInverseQuantization(int value, int quantStep) {
    if( quantStep ==0) {
        return value;
    } else {
        return value * quantStep;
    }
}
```

When the predictor of each point has neighbor points, the point cloud encoder (e.g., the arithmetic encoder 40012) according to the embodiments may perform entropy coding on the quantized and inversely quantized residual values as described above. When the predictor of each point has no neighbor point, the point cloud encoder according to the embodiments (for example, the arithmetic encoder 40012) may perform entropy coding on the attributes of the corresponding point without performing the above-described operation. The point cloud encoder according to the embodiments (for example, the lifting transformer 40010) may generate a predictor of each point, set the calculated LOD and register neighbor points in the predictor, and set weights according to the distances to neighbor points to perform lifting transform coding. The lifting transform coding according to the embodiments is similar to the above-described prediction transform coding, but differs therefrom in that weights are cumulatively applied to attribute values. The process of cumulatively applying weights to the attribute values according to embodiments is configured as follows.

1) Create an array Quantization Weight (QW) for storing the weight value of each point. The initial value of all elements of QW is 1.0. Multiply the QW values of the predictor indexes of the neighbor nodes registered in the predictor by the weight of the predictor of the current point, and add the values obtained by the multiplication.

2) Lift prediction process: Subtract the value obtained by multiplying the attribute value of the point by the weight from the existing attribute value to calculate a predicted attribute value.

3) Create temporary arrays called updateweight and update and initialize the temporary arrays to zero.

4) Cumulatively add the weights calculated by multiplying the weights calculated for all predictors by a weight stored in the QW corresponding to a predictor index to the updateweight array as indexes of neighbor nodes. Cumulatively add, to the update array, a value obtained by multiplying the attribute value of the index of a neighbor node by the calculated weight.

5) Lift update process: Divide the attribute values of the update array for all predictors by the weight value of the updateweight array of the predictor index, and add the existing attribute value to the values obtained by the division.

6) Calculate predicted attributes by multiplying the attribute values updated through the lift update process by the weight updated through the lift prediction process (stored in the QW) for all predictors. The point cloud encoder (e.g., coefficient quantizer 40011) according to the embodiments quantizes the predicted attribute values. In addition, the point cloud encoder (e.g., the arithmetic encoder 40012) performs entropy coding on the quantized attribute values.

The point cloud encoder (for example, the RAHT transformer 40008) according to the embodiments may perform RAHT transform coding in which attributes of nodes of a higher level are predicted using the attributes associated with nodes of a lower level in the octree. RAHT transform coding is an example of attribute intra coding through an octree backward scan. The point cloud encoder according to the embodiments scans the entire region from the voxel and repeats the merging process of merging the voxels into a larger block at each step until the root node is reached. The merging process according to the embodiments is performed only on the occupied nodes. The merging process is not performed on the empty node. The merging process is performed on an upper node immediately above the empty node.

The equation below represents a RAHT transformation matrix. In the equation, $g_{l_{x,y,z}}$ denotes the average attribute value of voxels at level l. $g_{l_{x,y,z}}$ may be calculated based on $g_{l+1_{2x,y,z}}$ and $g_{l+1_{2x+1,y,z}}$. The weights for $g_{l_{2x,y,z}}$ and $g_{l_{2x+1,y,z}}$ are $w1 = w_{l_{2x,y,z}}$ and $w2 = w_{l_{2x+1,y,z}}$.

$$\begin{bmatrix} g_{l-1_{x,y,z}} \\ h_{l-1_{x,y,z}} \end{bmatrix} = T_{w1w2} \begin{bmatrix} g_{l_{2x,y,z}} \\ g_{l_{2x+1,y,z}} \end{bmatrix} T_{w1w2} = \frac{1}{\sqrt{w1+w2}} \begin{bmatrix} \sqrt{w1} & \sqrt{w2} \\ -\sqrt{w2} & \sqrt{w1} \end{bmatrix}$$

Here, $g_{l-1_{x,y,z}}$ is a low-pass value and is used in the merging process at the next higher level. $h_{l-1_{x,y,z}}$ denotes high-pass coefficients. The high-pass coefficients at each step are quantized and subjected to entropy coding (for example, encoding by the arithmetic encoder 400012). The weights are calculated as $w_{l-1_{x,y,z}} = w_{l_{2x,y,z}} + w_{l_{2x+1,y,z}}$. The root node is created through the and $g_{1_{0,0,0}}$ and $g_{1_{0,0,1}}$ as follows.

$$\begin{bmatrix} gDC \\ h_{0_{0,0,0}} \end{bmatrix} = T_{w1000w1001} \begin{bmatrix} g_{1_{0,0,0z}} \\ g_{1_{0,0,1}} \end{bmatrix}$$

The value of gDC is also quantized and subjected to entropy coding like the high-pass coefficients.

Figure 10:
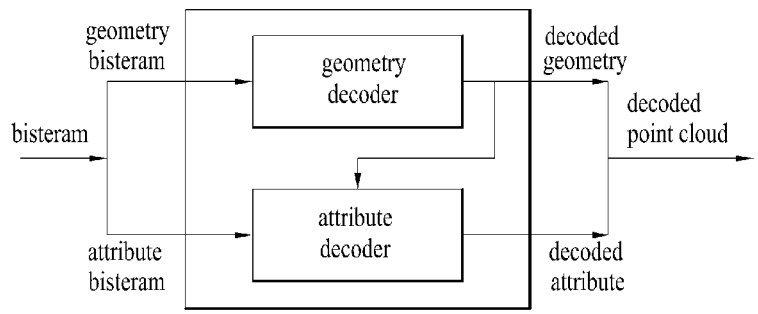
FIG. 10 illustrates an exemplary point cloud decoder according to embodiments.

FIG. 10 illustrates a point cloud decoder according to embodiments.

The point cloud decoder illustrated in FIG. 10 is an example of the point cloud video decoder 10006 described in FIG. 1, and may perform the same or similar operations as the operations of the point cloud video decoder 10006 illustrated in FIG. 1. As shown in the figure, the point cloud decoder may receive a geometry bitstream and an attribute bitstream contained in one or more bitstreams. The point cloud decoder includes a geometry decoder and an attribute decoder. The geometry decoder performs geometry decoding on the geometry bitstream and outputs decoded geometry. The attribute decoder performs attribute decoding based on the decoded geometry and the attribute bitstream, and outputs decoded attributes. The decoded geometry and decoded attributes are used to reconstruct point cloud content (a decoded point cloud).

Figure 11:
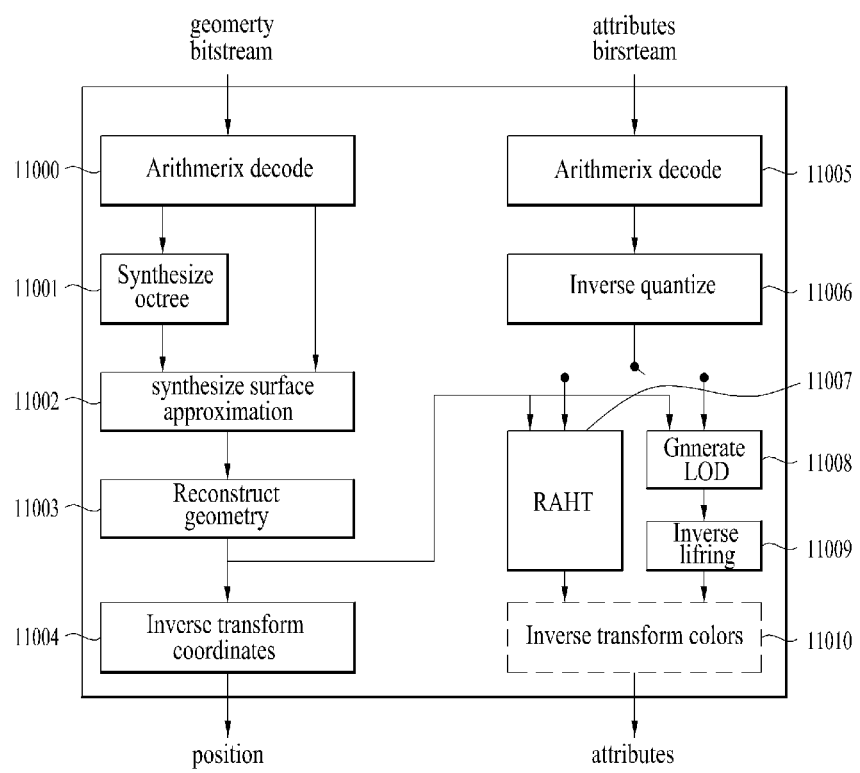
FIG. 11 illustrates an exemplary point cloud decoder according to embodiments.

FIG. 11 illustrates a point cloud decoder according to embodiments.

The point cloud decoder illustrated in FIG. 11 is an example of the point cloud decoder illustrated in FIG. 10, and may perform a decoding operation, which is an inverse process of the encoding operation of the point cloud encoder illustrated in FIGS. 1 to 9.

As described with reference to FIGS. 1 and 10, the point cloud decoder may perform geometry decoding and attribute decoding. The geometry decoding is performed before the attribute decoding.

The point cloud decoder according to the embodiments includes an arithmetic decoder (Arithmetic decode) 11000, an octree synthesizer (Synthesize octree) 11001, a surface approximation synthesizer (Synthesize surface approximation) 11002, and a geometry reconstructor (Reconstruct geometry) 11003, a coordinate inverse transformer (Inverse transform coordinates) 11004, an arithmetic decoder (Arithmetic decode) 11005, an inverse quantizer (Inverse quantize) 11006, a RAHT transformer 11007, an LOD generator (Generate LOD) 11008, an inverse lifter (inverse lifting) 11009, and/or a color inverse transformer (Inverse transform colors) 11010.

The arithmetic decoder 11000, the octree synthesizer 11001, the surface approximation synthesizer 11002, and the geometry reconstructor 11003, and the coordinate inverse transformer 11004 may perform geometry decoding. The geometry decoding according to the embodiments may include direct coding and trisoup geometry decoding. The direct coding and trisoup geometry decoding are selectively applied. The geometry decoding is not limited to the above-described example, and is performed as an inverse process of the geometry encoding described with reference to FIGS. 1 to 9.

The arithmetic decoder 11000 according to the embodiments decodes the received geometry bitstream based on the arithmetic coding. The operation of the arithmetic decoder 11000 corresponds to the inverse process of the arithmetic encoder 40004.

The octree synthesizer 11001 according to the embodiments may generate an octree by acquiring an occupancy code from the decoded geometry bitstream (or information on the geometry secured as a result of decoding). The occupancy code is configured as described in detail with reference to FIGS. 1 to 9.

When the trisoup geometry encoding is applied, the surface approximation synthesizer 11002 according to the embodiments may synthesize a surface based on the decoded geometry and/or the generated octree.

The geometry reconstructor 11003 according to the embodiments may regenerate geometry based on the surface and/or the decoded geometry. As described with reference to FIGS. 1 to 9, direct coding and trisoup geometry encoding are selectively applied. Accordingly, the geometry reconstructor 11003 directly imports and adds position information about the points to which direct coding is applied. When the trisoup geometry encoding is applied, the geometry reconstructor 11003 may reconstruct the geometry by performing the reconstruction operations of the geometry reconstructor 40005, for example, triangle reconstruction, up-sampling, and voxelization. Details are the same as those described with reference to FIG. 6, and thus description thereof is omitted. The reconstructed geometry may include a point cloud picture or frame that does not contain attributes.

The coordinate inverse transformer 11004 according to the embodiments may acquire positions of the points by transforming the coordinates based on the reconstructed geometry.

The arithmetic decoder 11005, the inverse quantizer 11006, the RAHT transformer 11007, the LOD generator 11008, the inverse lifter 11009, and/or the color inverse transformer 11010 may perform the attribute decoding described with reference to FIG. 10. The attribute decoding according to the embodiments includes region adaptive hierarchical transform (RAHT) decoding, interpolation-based hierarchical nearest-neighbor prediction (prediction transform) decoding, and interpolation-based hierarchical nearest-neighbor prediction with an update/lifting step (lifting transform) decoding. The three decoding schemes described above may be used selectively, or a combination of one or more decoding schemes may be used. The attribute decoding according to the embodiments is not limited to the above-described example.

The arithmetic decoder 11005 according to the embodiments decodes the attribute bitstream by arithmetic coding.

The inverse quantizer 11006 according to the embodiments inversely quantizes the information about the decoded attribute bitstream or attributes secured as a result of the decoding, and outputs the inversely quantized attributes (or attribute values). The inverse quantization may be selectively applied based on the attribute encoding of the point cloud encoder.

According to embodiments, the RAHT transformer 11007, the LOD generator 11008, and/or the inverse lifter 11009 may process the reconstructed geometry and the inversely quantized attributes. As described above, the RAHT transformer 11007, the LOD generator 11008, and/or the inverse lifter 11009 may selectively perform a decoding operation corresponding to the encoding of the point cloud encoder.

The color inverse transformer 11010 according to the embodiments performs inverse transform coding to inversely transform a color value (or texture) included in the decoded attributes. The operation of the color inverse transformer 11010 may be selectively performed based on the operation of the color transformer 40006 of the point cloud encoder.

Although not shown in the figure, the elements of the point cloud decoder of FIG. 11 may be implemented by hardware including one or more processors or integrated circuits configured to communicate with one or more memories included in the point cloud providing device, software, firmware, or a combination thereof. The one or more processors may perform at least one or more of the operations and/or functions of the elements of the point cloud decoder of FIG. 11 described above. Additionally, the one or more processors may operate or execute a set of software programs and/or instructions for performing the operations and/or functions of the elements of the point cloud decoder of FIG. 11.

Figure 12:
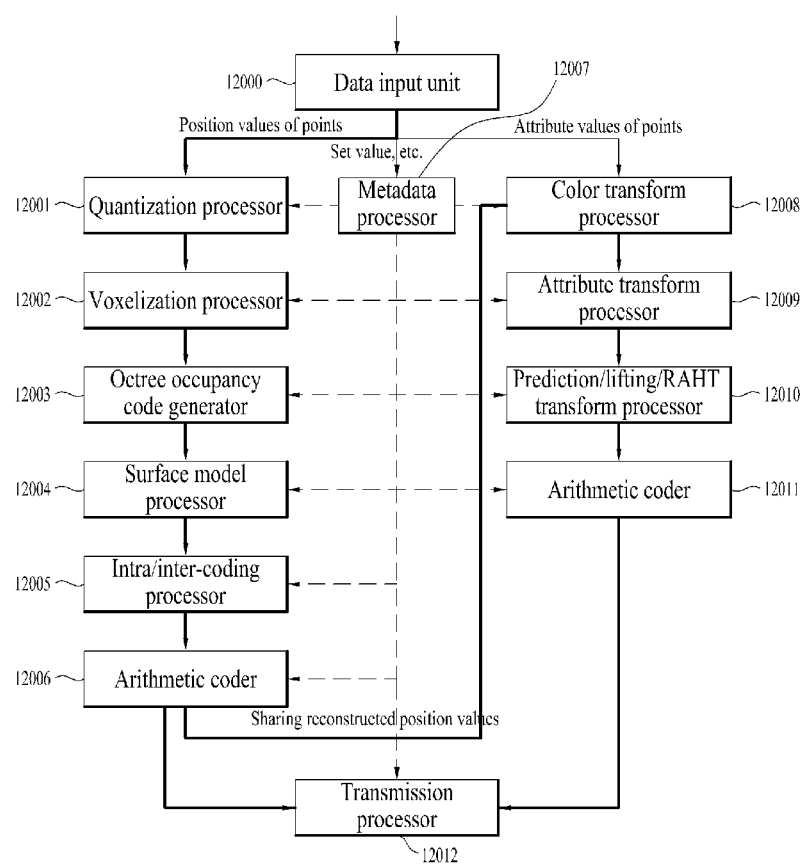
FIG. 12 illustrates an exemplary transmission device according to embodiments.

FIG. 12 illustrates an exemplary transmission device according to embodiments.

The transmission device shown in FIG. 12 is an example of the transmission device 10000 of FIG. 1 (or the point cloud encoder of FIG. 4). The transmission device illustrated in FIG. 12 may perform one or more of the operations and methods the same or similar to those of the point cloud encoder described with reference to FIGS. 1 to 9. The transmission device according to the embodiments may include a data input unit 12000, a quantization processor 12001, a voxelization processor 12002, an octree occupancy code generator 12003, a surface model processor 12004, an intra/inter-coding processor 12005, an arithmetic coder 12006, a metadata processor 12007, a color transform processor 12008, an attribute transform processor 12009, a prediction/lifting/RAHT transform processor 12010, an arithmetic coder 12011 and/or a transmission processor 12012.

The data input unit 12000 according to the embodiments receives or acquires point cloud data. The data input unit 12000 may perform an operation and/or acquisition method the same or similar to the operation and/or acquisition method of the point cloud video acquirer 10001 (or the acquisition process 20000 described with reference to FIG. 2).

The data input unit 12000, the quantization processor 12001, the voxelization processor 12002, the octree occupancy code generator 12003, the surface model processor 12004, the intra/inter-coding processor 12005, and the arithmetic coder 12006 perform geometry encoding. The geometry encoding according to the embodiments is the same or similar to the geometry encoding described with reference to FIGS. 1 to 9, and thus a detailed description thereof is omitted.

The quantization processor 12001 according to the embodiments quantizes geometry (e.g., position values of points). The operation and/or quantization of the quantization processor 12001 is the same or similar to the operation and/or quantization of the quantizer 40001 described with reference to FIG. 4. Details are the same as those described with reference to FIGS. 1 to 9.

The voxelization processor 12002 according to the embodiments voxelizes the quantized position values of the points. The voxelization processor 120002 may perform an operation and/or process the same or similar to the operation and/or the voxelization process of the quantizer 40001 described with reference to FIG. 4. Details are the same as those described with reference to FIGS. 1 to 9.

The octree occupancy code generator 12003 according to the embodiments performs octree coding on the voxelized positions of the points based on an octree structure. The octree occupancy code generator 12003 may generate an occupancy code. The octree occupancy code generator 12003 may perform an operation and/or method the same or similar to the operation and/or method of the point cloud encoder (or the octree analyzer 40002) described with reference to FIGS. 4 and 6. Details are the same as those described with reference to FIGS. 1 to 9.

The surface model processor 12004 according to the embodiments may perform trisoup geometry encoding based on a surface model to reconstruct the positions of points in a specific region (or node) on a voxel basis. The surface model processor 12004 may perform an operation and/or method the same or similar to the operation and/or method of the point cloud encoder (for example, the surface approximation analyzer 40003) described with reference to FIG. 4. Details are the same as those described with reference to FIGS. 1 to 9.

The intra/inter-coding processor 12005 according to the embodiments may perform intra/inter-coding on point cloud data. The intra/inter-coding processor 12005 may perform coding the same or similar to the intra/inter-coding described with reference to FIG. 7. Details are the same as those described with reference to FIG. 7. According to embodiments, the intra/inter-coding processor 12005 may be included in the arithmetic coder 12006.

The arithmetic coder 12006 according to the embodiments performs entropy encoding on an octree of the point cloud data and/or an approximated octree. For example, the encoding scheme includes arithmetic encoding. The arithmetic coder 12006 performs an operation and/or method the same or similar to the operation and/or method of the arithmetic encoder 40004.

The metadata processor 12007 according to the embodiments processes metadata about the point cloud data, for example, a set value, and provides the same to a necessary processing process such as geometry encoding and/or attribute encoding. Also, the metadata processor 12007 according to the embodiments may generate and/or process signaling information related to the geometry encoding and/or the attribute encoding. The signaling information according to the embodiments may be encoded separately from the geometry encoding and/or the attribute encoding. The signaling information according to the embodiments may be interleaved.

The color transform processor 12008, the attribute transform processor 12009, the prediction/lifting/RAHT transform processor 12010, and the arithmetic coder 12011 perform the attribute encoding. The attribute encoding according to the embodiments is the same or similar to the attribute encoding described with reference to FIGS. 1 to 9, and thus a detailed description thereof is omitted.

The color transform processor 12008 according to the embodiments performs color transform coding to transform color values included in attributes. The color transform processor 12008 may perform color transform coding based on the reconstructed geometry. The reconstructed geometry is the same as described with reference to FIGS. 1 to 9. Also, it performs an operation and/or method the same or similar to the operation and/or method of the color transformer 40006 described with reference to FIG. 4 is performed. A detailed description thereof is omitted.

The attribute transform processor 12009 according to the embodiments performs attribute transformation to transform the attributes based on the reconstructed geometry and/or the positions on which geometry encoding is not performed. The attribute transform processor 12009 performs an operation and/or method the same or similar to the operation and/or method of the attribute transformer 40007 described with reference to FIG. 4. The detailed description thereof is omitted. The prediction/lifting/RAHT transform processor 12010 according to the embodiments may code the transformed attributes by any one or a combination of RAHT coding, prediction transform coding, and lifting transform coding. The prediction/lifting/RAHT transform processor 12010 performs at least one of the operations the same or similar to the operations of the RAHT transformer 40008, the LOD generator 40009, and the lifting transformer 40010 described with reference to FIG. 4. In addition, the prediction transform coding, the lifting transform coding, and the RAHT transform coding are the same as those described with reference to FIGS. 1 to 9, and thus a detailed description thereof is omitted.

The arithmetic coder 12011 according to the embodiments may encode the coded attributes based on the arithmetic coding. The arithmetic coder 12011 performs an operation and/or method the same or similar to the operation and/or method of the arithmetic encoder 400012.

The transmission processor 12012 according to the embodiments may transmit each bitstream containing encoded geometry and/or encoded attributes and metadata information, or transmit one bitstream configured with the encoded geometry and/or the encoded attributes and the metadata information. When the encoded geometry and/or the encoded attributes and the metadata information according to the embodiments are configured into one bitstream, the bitstream may include one or more sub-bitstreams. The bitstream according to the embodiments may contain signaling information including a sequence parameter set (SPS) for signaling of a sequence level, a geometry parameter set (GPS) for signaling of geometry information coding, an attribute parameter set (APS) for signaling of attribute information coding, and a tile parameter set (TPS) for signaling of a tile level, and slice data. The slice data may include information about one or more slices. One slice according to embodiments may include one geometry bitstream Geom0$^0$ and one or more attribute bitstreams Attr0$^0$ and Attr1$^0$. The TPS according to the embodiments may include information about each tile (for example, coordinate information and height/size information about a bounding box) for one or more tiles. The geometry bitstream may contain a header and a payload. The header of the geometry bitstream according to the embodiments may contain a parameter set identifier (geom_parameter_set_id), a tile identifier (geom_tile_id) and a slice identifier (geom_slice_id) included in the GPS, and information about the data contained in the payload. As described above, the metadata processor 12007 according to the embodiments may generate and/or process the signaling information and transmit the same to the transmission processor 12012. According to embodiments, the elements to perform geometry encoding and the elements to perform attribute encoding may share data/information with each other as indicated by dotted lines. The transmission processor 12012 according to the embodiments may perform an operation and/or transmission method the same or similar to the operation and/or transmission method of the transmitter 10003. Details are the same as those described with reference to FIGS. 1 and 2, and thus a description thereof is omitted.

Figure 13:
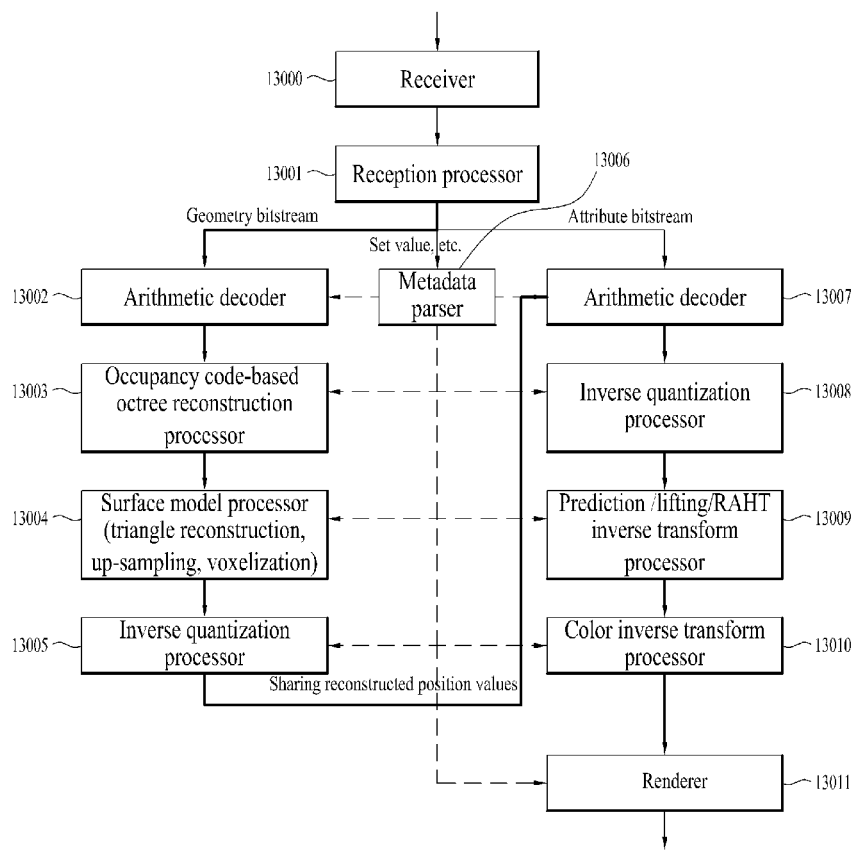
FIG. 13 illustrates an exemplary reception device according to embodiments.

FIG. 13 illustrates an exemplary reception device according to embodiments.

The reception device illustrated in FIG. 13 is an example of the reception device 10004 of FIG. 1 (or the point cloud decoder of FIGS. 10 and 11). The reception device illustrated in FIG. 13 may perform one or more of the operations and methods the same or similar to those of the point cloud decoder described with reference to FIGS. 1 to 11.

The reception device according to the embodiment includes a receiver 13000, a reception processor 13001, an arithmetic decoder 13002, an occupancy code-based octree reconstruction processor 13003, a surface model processor (triangle reconstruction, up-sampling, voxelization) 13004, an inverse quantization processor 13005, a metadata parser 13006, an arithmetic decoder 13007, an inverse quantization processor 13008, a prediction/lifting/RAHT inverse transform processor 13009, a color inverse transform processor 13010, and/or a renderer 13011. Each element for decoding according to the embodiments may perform an inverse process of the operation of a corresponding element for encoding according to the embodiments.

The receiver 13000 according to the embodiments receives point cloud data. The receiver 13000 may perform an operation and/or reception method the same or similar to the operation and/or reception method of the receiver 10005 of FIG. 1. The detailed description thereof is omitted.

The reception processor 13001 according to the embodiments may acquire a geometry bitstream and/or an attribute bitstream from the received data. The reception processor 13001 may be included in the receiver 13000.

The arithmetic decoder 13002, the occupancy code-based octree reconstruction processor 13003, the surface model processor 13004, and the inverse quantization processor 1305 may perform geometry decoding. The geometry decoding according to embodiments is the same or similar to the geometry decoding described with reference to FIGS. 1 to 10, and thus a detailed description thereof is omitted.

The arithmetic decoder 13002 according to the embodiments may decode the geometry bitstream based on arithmetic coding. The arithmetic decoder 13002 performs an operation and/or coding the same or similar to the operation and/or coding of the arithmetic decoder 11000.

The occupancy code-based octree reconstruction processor 13003 according to the embodiments may reconstruct an octree by acquiring an occupancy code from the decoded geometry bitstream (or information about the geometry secured as a result of decoding). The occupancy code-based octree reconstruction processor 13003 performs an operation and/or method the same or similar to the operation and/or octree generation method of the octree synthesizer 11001. When the trisoup geometry encoding is applied, the surface model processor 1302 according to the embodiments may perform trisoup geometry decoding and related geometry reconstruction (for example, triangle reconstruction, up-sampling, voxelization) based on the surface model method. The surface model processor 1302 performs an operation the same or similar to that of the surface approximation synthesizer 11002 and/or the geometry reconstructor 11003.

The inverse quantization processor 1305 according to the embodiments may inversely quantize the decoded geometry.

The metadata parser 1306 according to the embodiments may parse metadata contained in the received point cloud data, for example, a set value. The metadata parser 1306 may pass the metadata to geometry decoding and/or attribute decoding. The metadata is the same as that described with reference to FIG. 12, and thus a detailed description thereof is omitted.

The arithmetic decoder 13007, the inverse quantization processor 13008, the prediction/lifting/RAHT inverse transform processor 13009 and the color inverse transform processor 13010 perform attribute decoding. The attribute decoding is the same or similar to the attribute decoding described with reference to FIGS. 1 to 10, and thus a detailed description thereof is omitted.

The arithmetic decoder 13007 according to the embodiments may decode the attribute bitstream by arithmetic coding. The arithmetic decoder 13007 may decode the attribute bitstream based on the reconstructed geometry. The arithmetic decoder 13007 performs an operation and/or coding the same or similar to the operation and/or coding of the arithmetic decoder 11005.

The inverse quantization processor 13008 according to the embodiments may inversely quantize the decoded attribute bitstream. The inverse quantization processor 13008 performs an operation and/or method the same or similar to the operation and/or inverse quantization method of the inverse quantizer 11006.

The prediction/lifting/RAHT inverse transformer 13009 according to the embodiments may process the reconstructed geometry and the inversely quantized attributes. The prediction/lifting/RAHT inverse transform processor 1301 performs one or more of operations and/or decoding the same or similar to the operations and/or decoding of the RAHT transformer 11007, the LOD generator 11008, and/or the inverse lifter 11009. The color inverse transform processor 13010 according to the embodiments performs inverse transform coding to inversely transform color values (or textures) included in the decoded attributes. The color inverse transform processor 13010 performs an operation and/or inverse transform coding the same or similar to the operation and/or inverse transform coding of the color inverse transformer 11010. The renderer 13011 according to the embodiments may render the point cloud data.

Figure 14:
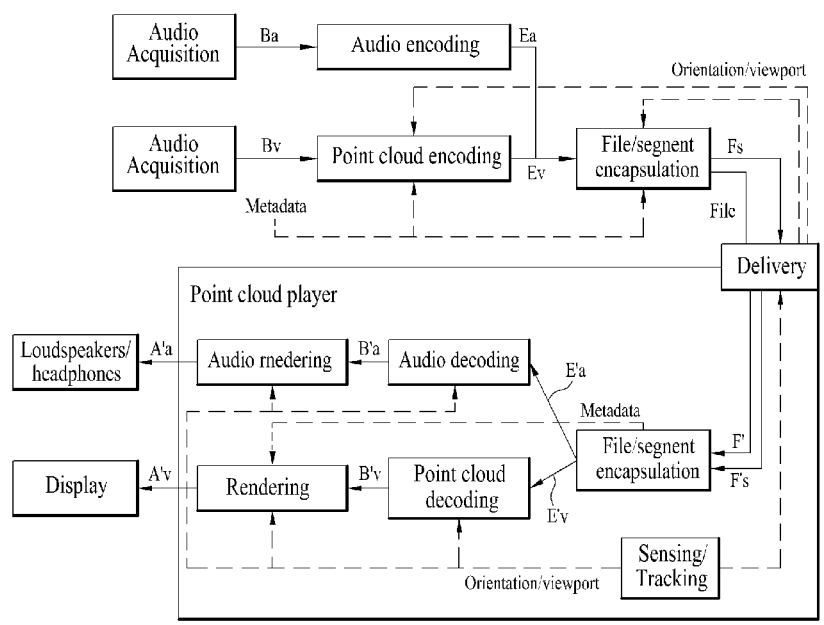
FIG. 14 illustrates an architecture for streaming G-PCC-based point cloud data according to embodiments.

FIG. 14 illustrates an architecture for streaming G-PCC-based point cloud data according to embodiments.

The upper part of FIG. 14 shows a process of processing and transmitting point cloud content by the transmission device described in FIGS. 1 to 13 (for example, the transmission device 10000, the transmission device of FIG. 12, etc.).

As described with reference to FIGS. 1 to 13, the transmission device may acquire audio Ba of the point cloud content (Audio Acquisition), encode the acquired audio (Audio Encoding), and output an audio bitstream Ea. In addition, the transmission device may acquire a point cloud (or point cloud video) By of the point cloud content (Point Acquisition), and perform point cloud encoding on the acquired point cloud to output a point cloud video bitstream Eb. The point cloud encoding of the transmission device is the same or similar to the point cloud encoding described with reference to FIGS. 1 to 13 (for example, the encoding of the point cloud encoder of FIG. 4), and thus a detailed description thereof will be omitted.

The transmission device may encapsulate the generated audio bitstream and video bitstream into a file and/or a segment (File/segment encapsulation). The encapsulated file and/or segment Fs, File may include a file in a file format such as ISOBMFF or a DASH segment. Point cloud-related metadata according to embodiments may be contained in the encapsulated file format and/or segment. The metadata may be contained in boxes of various levels on the ISOBMFF file format, or may be contained in a separate track within the file. According to an embodiment, the transmission device may encapsulate the metadata into a separate file. The transmission device according to the embodiments may deliver the encapsulated file format and/or segment over a network. The processing method for encapsulation and transmission by the transmission device is the same as that described with reference to FIGS. 1 to 13 (for example, the transmitter 10003, the transmission step 20002 of FIG. 2, etc.), and thus a detailed description thereof will be omitted.

The lower part of FIG. 14 shows a process of processing and outputting point cloud content by the reception device (for example, the reception device 10004, the reception device of FIG. 13, etc.) described with reference to FIGS. 1 to 13.

According to embodiments, the reception device may include devices configured to output final audio data and final video data (e.g., loudspeakers, headphones, a display), and a point cloud player configured to process point cloud content (a point cloud player). The final data output devices and the point cloud player may be configured as separate physical devices. The point cloud player according to the embodiments may perform geometry-based point cloud compression (G-PCC) coding, video-based point cloud compression (V-PCC) coding and/or next-generation coding.

The reception device according to the embodiments may secure a file and/or segment F', Fs' contained in the received data (for example, a broadcast signal, a signal transmitted over a network, etc.) and decapsulate the same (File/segment decapsulation). The reception and decapsulation methods of the reception device is the same as those described with reference to FIGS. 1 to 13 (for example, the receiver 10005, the reception unit 13000, the reception processing unit 13001, etc.), and thus a detailed description thereof will be omitted.

The reception device according to the embodiments secures an audio bitstream E' a and a video bitstream E'v contained in the file and/or segment. As shown in the figure, the reception device outputs decoded audio data B' a by performing audio decoding on the audio bitstream, and renders the decoded audio data (audio rendering) to output final audio data A' a through loudspeakers or headphones.

Also, the reception device performs point cloud decoding on the video bitstream E'v and outputs decoded video data B'v. The point cloud decoding according to the embodiments is the same or similar to the point cloud decoding described with reference to FIGS. 1 to 13 (for example, decoding of the point cloud decoder of FIG. 11), and thus a detailed description thereof will be omitted. The reception device may render the decoded video data and output final video data through the display.

The reception device according to the embodiments may perform at least one of decapsulation, audio decoding, audio rendering, point cloud decoding, and point cloud video rendering based on the transmitted metadata. The details of the metadata are the same as those described with reference to FIGS. 12 to 13, and thus a description thereof will be omitted.

As indicated by a dotted line shown in the figure, the reception device according to the embodiments (for example, a point cloud player or a sensing/tracking unit in the point cloud player) may generate feedback information (orientation, viewport). According to embodiments, the feedback information may be used in a decapsulation process, a point cloud decoding process and/or a rendering process of the reception device, or may be delivered to the transmission device. Details of the feedback information are the same as those described with reference to FIGS. 1 to 13, and thus a description thereof will be omitted.

Figure 15:
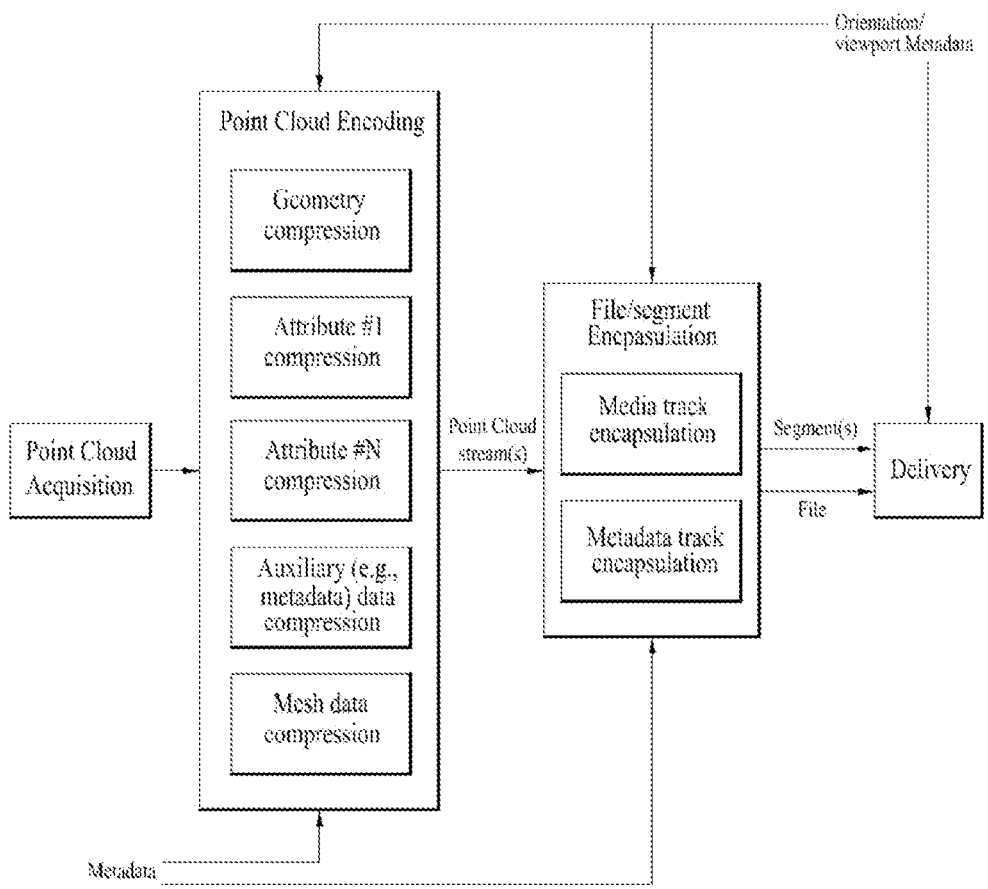
FIG. 15 illustrates an exemplary point cloud transmission device according to embodiments.

FIG. 15 shows an exemplary transmission device according to embodiments.

The transmission device of FIG. 15 is a device configured to transmit point cloud content, and corresponds to an example of the transmission device described with reference to FIGS. 1 to 14 (e.g., the transmission device 10000 of FIG. 1, the point cloud encoder of FIG. 4, the transmission device of FIG. 12, the transmission device of FIG. 14). Accordingly, the transmission device of FIG. 15 performs an operation that is identical or similar to that of the transmission device described with reference to FIGS. 1 to 14.

The transmission device according to the embodiments may perform one or more of point cloud acquisition, point cloud encoding, file/segment encapsulation and delivery.

Since the operation of point cloud acquisition and delivery illustrated in the figure is the same as the operation described with reference to FIGS. 1 to 14, a detailed description thereof will be omitted.

As described above with reference to FIGS. 1 to 14, the transmission device according to the embodiments may perform geometry encoding and attribute encoding. The geometry encoding may be referred to as geometry compression, and the attribute encoding may be referred to as attribute compression. As described above, one point may have one geometry and one or more attributes. Accordingly, the transmission device performs attribute encoding on each attribute. The figure illustrates that the transmission device performs one or more attribute compressions (attribute #1 compression, . . . , attribute #N compression). In addition, the transmission device according to the embodiments may perform auxiliary compression. The auxiliary compression is performed on the metadata. Details of the metadata are the same as those described with reference to FIGS. 1 to 14, and thus a description thereof will be omitted. The transmission device may also perform mesh data compression. The mesh data compression according to the embodiments may include the trisoup geometry encoding described with reference to FIGS. 1 to 14.

The transmission device according to the embodiments may encapsulate bitstreams (e.g., point cloud streams) output according to point cloud encoding into a file and/or a segment. According to embodiments, the transmission device may perform media track encapsulation for carrying data (for example, media data) other than the metadata, and perform metadata track encapsulation for carrying metadata. According to embodiments, the metadata may be encapsulated into a media track.

As described with reference to FIGS. 1 to 14, the transmission device may receive feedback information (orientation/viewport metadata) from the reception device, and perform at least one of the point cloud encoding, file/segment encapsulation, and delivery operations based on the received feedback information. Details are the same as those described with reference to FIGS. 1 to 14, and thus a description thereof will be omitted.

Figure 16:
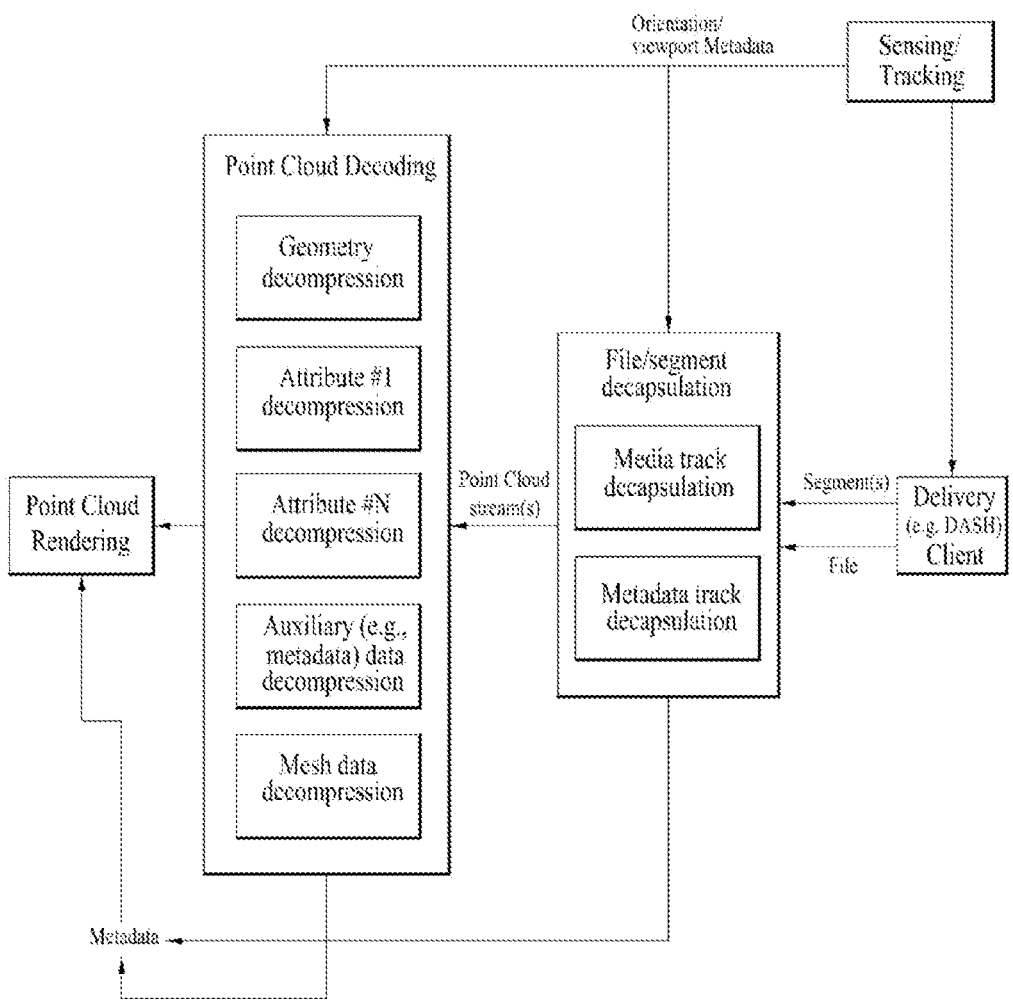
FIG. 16 illustrates an exemplary point cloud reception device according to embodiments.

FIG. 16 shows an exemplary reception device according to embodiments.

The reception device of FIG. 16 is a device for receiving point cloud content, and corresponds to an example of the reception device described with reference to FIGS. 1 to 14 (for example, the reception device 10004 of FIG. 1, the point cloud decoder of FIG. 11, and the reception device of FIG. 13, the reception device of FIG. 14). Accordingly, the reception device of FIG. 16 performs an operation that is identical or similar to that of the reception device described with reference to FIGS. 1 to 14. The reception device of FIG. 16 may receive a signal transmitted from the transmission device of FIG. 15, and perform a reverse process of the operation of the transmission device of FIG. 15.

The reception device according to the embodiments may perform at least one of delivery, file/segment decapsulation, point cloud decoding, and point cloud rendering.

Since the point cloud reception and point cloud rendering operations illustrated in the figure are the same as those described with reference to FIGS. 1 to 14, a detailed description thereof will be omitted.

As described with reference to FIGS. 1 to 14, the reception device according to the embodiments decapsulate the file and/or segment acquired from a network or a storage device. According to embodiments, the reception device may perform media track decapsulation for carrying data (for example, media data) other than the metadata, and perform metadata track decapsulation for carrying metadata. According to embodiments, in the case where the metadata is encapsulated into a media track, the metadata track decapsulation is omitted.

As described with reference to FIGS. 1 to 14, the reception device may perform geometry decoding and attribute decoding on bitstreams (e.g., point cloud streams) secured through decapsulation. The geometry decoding may be referred to as geometry decompression, and the attribute decoding may be referred to as attribute decompression. As described above, one point may have one geometry and one or more attributes, each of which is encoded by the transmission device. Accordingly, the reception device performs attribute decoding on each attribute. The figure illustrates that the reception device performs one or more attribute decompressions (attribute #1 decompression, . . . , attribute #N decompression). The reception device according to the embodiments may also perform auxiliary decompression. The auxiliary decompression is performed on the metadata. Details of the metadata are the same as those described with reference to FIGS. 1 to 14, and thus a disruption thereof will be omitted. The reception device may also perform mesh data decompression. The mesh data decompression according to the embodiments may include the trisoup geometry decoding described with reference to FIGS. 1 to 14. The reception device according to the embodiments may render the point cloud data that is output according to the point cloud decoding.

As described with reference to FIGS. 1 to 14, the reception device may secure orientation/viewport metadata using a separate sensing/tracking element, and transmit feedback information including the same to a transmission device (for example, the transmission device of FIG. 15). In addition, the reception device may perform at least one of a reception operation, file/segment decapsulation, and point cloud decoding based on the feedback information. Details are the same as those described with reference to FIGS. 1 to 14, and thus a description thereof will be omitted.

Figure 17:
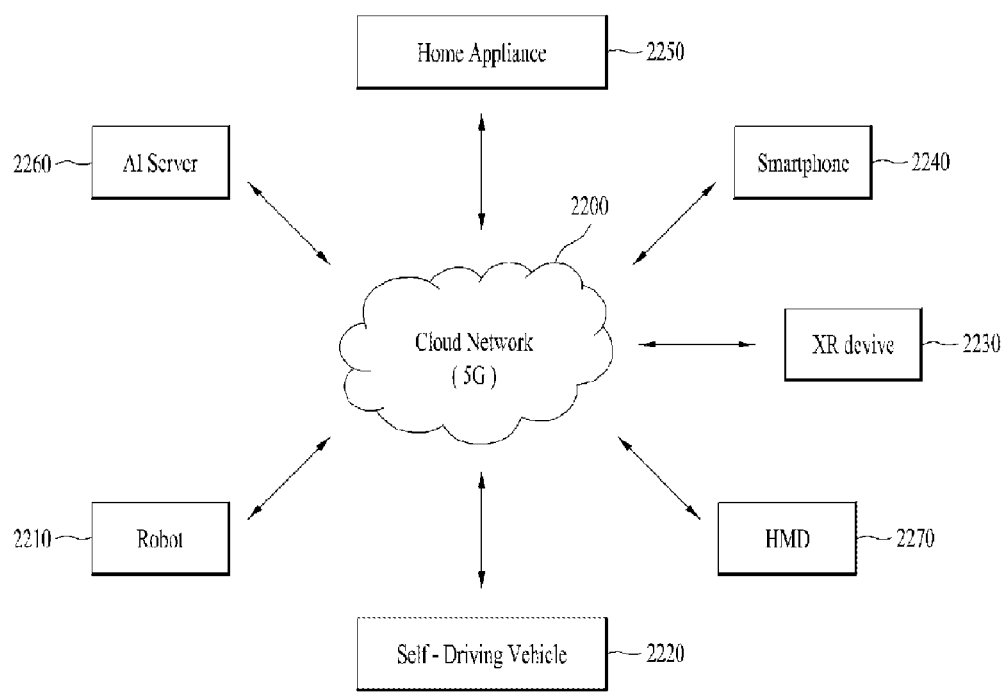
FIG. 17 illustrates an exemplary structure operatively connectable with a method/device for transmitting and receiving point cloud data according to embodiments.

FIG. 17 shows an exemplary structure operatively connectable with a method/device for transmitting and receiving point cloud data according to embodiments.

The structure of FIG. 17 represents a configuration in which at least one of a server 1760, a robot 1710, a self-driving vehicle 1720, an XR device 1730, a smartphone 1740, a home appliance 1750, and/or an HMD 1770 is connected to a cloud network 1700. The robot 1710, the self-driving vehicle 1720, the XR device 1730, the smartphone 1740, or the home appliance 1750 is referred to as a device. Further, the XR device 1730 may correspond to a point cloud data (PCC) device according to embodiments or may be operatively connected to the PCC device.

The cloud network 1700 may represent a network that constitutes part of the cloud computing infrastructure or is present in the cloud computing infrastructure. Here, the cloud network 1700 may be configured using a 3G network, 4G or Long Term Evolution (LTE) network, or a 5G network.

The server 1760 may be connected to at least one of the robot 1710, the self-driving vehicle 1720, the XR device 1730, the smartphone 1740, the home appliance 1750, and/or the HMD 1770 over the cloud network 1700 and may assist at least a part of the processing of the connected devices 1710 to 1770.

The HMD 1770 represents one of the implementation types of the XR device and/or the PCC device according to the embodiments. According to embodiments, an HMD type device includes a communication unit, a control unit, a memory, an I/O unit, a sensor unit, and a power supply unit.

Hereinafter, various embodiments of the devices 1710 to 1750 to which the above-described technology is applied will be described. The devices 1710 to 1750 illustrated in FIG. 17 may be operatively connected/coupled to a point cloud data transmission/reception device according to the above-described embodiments.

<PCC+XR>

The XR/PCC device 1730 may employ PCC technology and/or XR (AR+VR) technology, and may be implemented as an HMD, a head-up display (HUD) provided in a vehicle, a television, a mobile phone, a smartphone, a computer, a wearable device, a home appliance, a digital signage, a vehicle, a stationary robot, or a mobile robot.

The XR/PCC device 1730 may analyze 3D point cloud data or image data acquired through various sensors or from an external device and generate position data and attribute data about 3D points. Thereby, the XR/PCC device 1730 may acquire information about the surrounding space or a real object, and render and output an XR object. For example, the XR/PCC device 1730 may match an XR object including auxiliary information about a recognized object with the recognized object and output the matched XR object.

<PCC+Self-driving+XR>

The self-driving vehicle 1720 may be implemented as a mobile robot, a vehicle, an unmanned aerial vehicle, or the like by applying the PCC technology and the XR technology.

The self-driving vehicle 1720 to which the XR/PCC technology is applied may represent an autonomous vehicle provided with means for providing an XR image, or an autonomous vehicle that is a target of control/interaction in the XR image. In particular, the self-driving vehicle 1720, which is a target of control/interaction in the XR image, may be distinguished from the XR device 1730 and may be operatively connected thereto.

The self-driving vehicle 1720 having means for providing an XR/PCC image may acquire sensor information from the sensors including a camera, and output the generated XR/PCC image based on the acquired sensor information. For example, the self-driving vehicle 1720 may have an HUD and output an XR/PCC image thereto to provide an occupant with an XR/PCC object corresponding to a real object or an object present on the screen.

In this case, when the XR/PCC object is output to the HUD, at least a part of the XR/PCC object may be output to overlap the real object to which the occupant's eyes are directed. On the other hand, when the XR/PCC object is output on a display provided inside the self-driving vehicle, at least a part of the XR/PCC object may be output to overlap the object on the screen. For example, the self-driving vehicle 1220 may output XR/PCC objects corresponding to objects such as a road, another vehicle, a traffic light, a traffic sign, a two-wheeled vehicle, a pedestrian, and a building.

The virtual reality (VR) technology, the augmented reality (AR) technology, the mixed reality (MR) technology and/or the point cloud compression (PCC) technology according to the embodiments are applicable to various devices.

In other words, the VR technology is a display technology that provides only CG images of real-world objects, backgrounds, and the like. On the other hand, the AR technology refers to a technology that shows a virtually created CG image on the image of a real object. The MR technology is similar to the AR technology described above in that virtual objects to be shown are mixed and combined with the real world. However, the MR technology differs from the AR technology in that the AR technology makes a clear distinction between a real object and a virtual object created as a CG image and uses virtual objects as complementary objects for real objects, whereas the MR technology treats virtual objects as objects having equivalent characteristics as real objects. More specifically, an example of MR technology applications is a hologram service.

Recently, the VR, AR, and MR technologies are sometimes referred to as extended reality (XR) technology rather than being clearly distinguished from each other. Accordingly, embodiments of the present disclosure are applicable to any of the VR, AR, MR, and XR technologies. The encoding/decoding based on PCC, V-PCC, and G-PCC techniques is applicable to such technologies.

The PCC method/device according to the embodiments may be applied to a vehicle that provides a self-driving service.

A vehicle that provides the self-driving service is connected to a PCC device for wired/wireless communication.

When the point cloud data (PCC) transmission/reception device according to the embodiments is connected to a vehicle for wired/wireless communication, the device may receive/process content data related to an AR/VR/PCC service, which may be provided together with the self-driving service, and transmit the same to the vehicle. In the case where the PCC transmission/reception device is mounted on a vehicle, the PCC transmission/reception device may receive/process content data related to the AR/VR/PCC service according to a user input signal input through a user interface device and provide the same to the user. The vehicle or the user interface device according to the embodiments may receive a user input signal. The user input signal according to the embodiments may include a signal indicating the self-driving service.

The method/device according to the embodiments may refer to a point cloud data transmission/reception method and/or a point cloud data transmission/reception device. According to embodiments, the geometry information may be referred to as geometric information, and the attribute information may be referred to as attribute information.

The encoder according to the embodiments may be referred to as a point cloud data encoder, a point cloud encoder, a point cloud encoder, or the like, according to the embodiments. The decoder according to the embodiments may be referred to as a point cloud data decoder, a point cloud decoder, a point cloud decoder, or the like, according to the embodiments.

A geometry bitstream of point cloud data according to embodiments may be called a geometry bitstream, and an attribute bitstream of point cloud data according to embodiments may be called an attribute bitstream.

Figure 18:
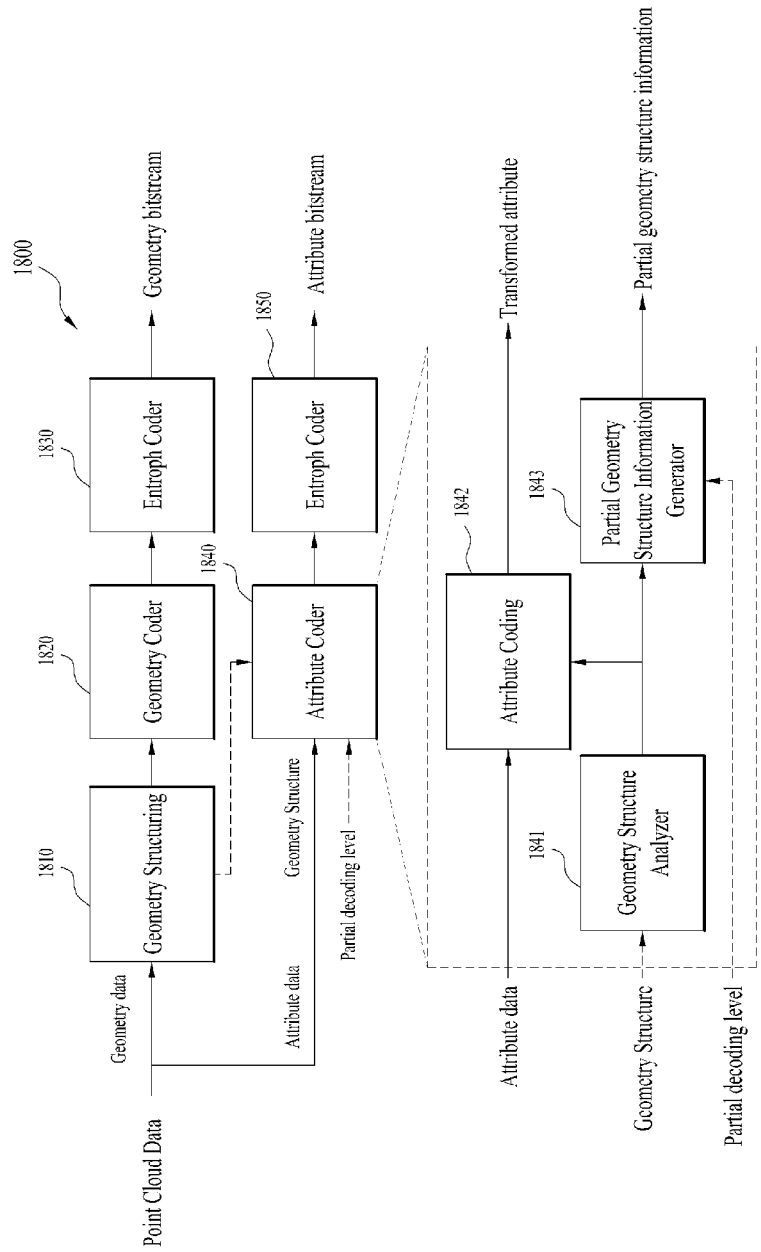
FIG. 18 is a block diagram illustrating an example of a point cloud encoder.

FIG. 18 is a block diagram illustrating an example of a point cloud encoder.

A point cloud encoder 1800 (e.g., the point cloud video encoder 10002 of FIG. 1, the point cloud encoder of FIG. 4, the point cloud encoder described with reference to FIGS. 12, 14 and 15) according to embodiments may perform the encoding operation described with reference to FIGS. 1 to 17. The point cloud encoder 1800 according to the embodiments includes a geometry constructing unit 1810, a geometry coder 1820, an entropy coder 1830, an attribute coder 1840, and an entropy coder 1850. Although not shown in FIG. 18, the point cloud encoder 1800 according to the embodiments may further include one or more elements configured to perform the encoding operation described with reference to FIGS. 1 to 17.

Point cloud (PCC) data or point cloud compression (PCC) data is input data for the point cloud encoder 1800 and may include geometry and/or attributes. The geometry according to the embodiments is information indicating a position (e.g., a location) of a point, and may be represented as parameters of a coordinate system such as orthogonal coordinates, cylindrical coordinates, or spherical coordinates. The attribute according to the embodiments indicates an attribute of a point (e.g., color, transparency, reflectance, grayscale, etc.). The geometry may be referred to as geometry information (or geometry data), and the attribute may be referred to as attribute information (or attribute data).

The geometry constructing unit 1810 according to the embodiments structures geometry information of PCC data input for geometry coding into a structure such as an octree. According to embodiments, the geometry information is structured based on at least one of an octree, a quadtree, a binary tree, a triple tree, or a k-d tree.

The geometry coder 1820 according to the embodiments codes the structured geometry information.

The entropy coder 1830 according to the embodiments entropy-codes the coded geometry information and outputs a geometry bitstream.

The geometry constructing unit 1810, the geometry coder 1820, and the entropy coder 1830 according to the embodiments perform the geometry coding (or geometry encoding) described with reference to FIGS. 1 to 17. The operations of the geometry constructing unit 1810, the geometry coder 1820, and the entropy coder 1830 according to the embodiments are the same as or similar to the operations of the coordinate transformer 40000, the quantizer 40001, the octree analyzer 40002, the surface approximation analyzer 40003, the arithmetic encoder 40004, and the geometry reconstructor (Reconstruct Geometry, 40005). Also, the operations of the geometry constructing unit 1810, the geometry coder 1820, and the entropy coder 1830 according to the embodiments are the same as or similar to the operations of the data input unit 12000, the quantization processor 12001, the voxelization processor 12002, the octree occupancy code generator 12003, the surface model processor 12004, the intra/inter-coding processor 12005, the arithmetic coder 12006, and the metadata processor 12007 described with reference to FIG. 12.

The attribute coder 1840 according to the embodiments receives attribute information and information on a geometry structure, and performs attribute coding. The entropy coder 1850 according to the embodiments entropy-codes the coded attribute information and outputs an attribute bitstream.

The attribute coder 1840 and the entropy coder 1850 according to the embodiments perform attribute encoding (or attribute coding). The operations of the attribute coder 1840 and the entropy coder 1850 according to the embodiments are the same as or similar to the operations of the geometry reconstructor 40005, the color transformer 40006, the attribute transformer 40007, and the RAHT transformer 40008, the LOD generator 40009, the lifting transformer 40010, the coefficient quantizer 40011, and/or the arithmetic encoder 40012 described with reference to FIG. 4. Also, the operations of the attribute coder 1840 and the entropy coder 1850 according to the embodiments are the same as or similar to the operations of the color transform processor 12008, the attribute transform processor 12009, the prediction/lifting/RAHT transform processor 12010, and the arithmetic coder 12011 described with reference to FIG. 12.

As shown in FIGS. 1 to 17, the attribute encoding according to the embodiments may include color transform coding, attribute transform coding, RAHT coding, prediction transform coding, and lifting transform coding. The RAHT coding, prediction transform coding, and lifting transform coding may be selectively used or a combination of one or more thereof may be used, depending on the point cloud content. The attribute encoding according to the embodiments is not limited to the above-described example.

The attribute coder 1840 according to the embodiments may generate scalable coding information for scalable decoding. The scalable decoding according to the embodiments is decoding selectively performed on a part or the entirety of the geometry and/or attributes by the reception device (e.g., the reception device 10004 of FIG. 1, the point cloud decoder of FIGS. 10 and 11, and the reception device of FIG. 13) according to the decoding performance of the reception device. The part of the geometry and attributes according to the embodiments is referred to as partial geometry and partial attributes. Scalable decoding applied to the geometry according to the embodiments is called scalable geometry decoding or geometry scalable decoding. Scalable decoding applied to attributes according to the embodiments is called scalable attribute decoding or attribute scalable decoding. As described above with reference to FIGS. 1 to 17, points of the point cloud content are distributed in a three-dimensional space, and the distributed points are represented in an octree structure. The octree structure is an octal tree structure, and the depth thereof increases from a higher upper node to a lower node. The depth according to the embodiments is referred to as a level and/or a layer. Thus, to provide low-resolution point cloud content, the reception device may perform geometry decoding (or geometry scalable decoding) on the partial geometry and/or partial attribute (or attribute scalable decoding) on partial attributes from a higher node up to a lower node corresponding to a specific depth or level in the octree structure. In addition, the reception device may perform geometry and attribute decoding corresponding to the entire octree structure to provide high-resolution point cloud content.

Scalable decoding supports reception devices with various capabilities and enables point cloud service to be provided even in an adaptive bitrate environment. However, since attribute decoding is performed based on geometry decoding, geometry information is required to accurately perform attribute decoding. For example, a transform coefficient for RAHT coding is determined based on geometry distribution information (or geometry structure information) (e.g., an octree structure). Prediction transform coding and lifting transform coding require entire geometry distribution information to obtain points belonging to each LOD.

Accordingly, the reception device may receive and process the entire geometry in order to stably perform attribute decoding. However, it is inefficient in terms of bitrate to transmit and receive geometry information that is not actually displayed according to the performance of the reception device. In addition, if the reception device decodes the entire geometry, a delay may occur in providing a point cloud content service. Further, when the decoder of the reception device exhibits low performance, not all the geometry may be decoded. Accordingly, the attribute coder 1840 according to the embodiments generates scalable coding information and transmits the same to the reception device. The reception device may perform scalable attribute decoding, which may reduce delay and enable efficient coding based on the received scalable coding information.

The attribute coder 1840 according to the embodiments includes a geometry structure analyzer 1841, an attribute coding unit 1842, and a partial geometry structure information generator 1843. Although the geometry structure analyzer 1841 and the partial geometry structure information generator 1843 according to the embodiments are represented as separate blocks, they may be referred to as one geometry structure analyzer 1841.

The geometry structure analyzer 1841 according to the embodiments may analyze a geometry structure. The geometry structure analyzer 1841 may calculate a parameter, a coefficient, and the like for RAHT coding. The attribute coding unit 1842 may output a transformed attribute based on the attribute information and the output data from the geometry structure analyzer 1841.

The partial geometry structure information generator 1843 according to the embodiments generates partial geometry structure information according to a partial decoding level based on the data received from the geometry structure analyzer 1841. The partial decoding level according to the embodiments indicates a depth or level of an octree structure to which scalable decoding is applied, and the value may be changed. The partial geometry structure information according to the embodiments may be included in the scalable coding information, and may be used in place of geometry information that may be lost in scalable decoding (that is, geometry information corresponding to a level higher than the level as indicated by the partial decoding level) in the information generated by the geometry structure analyzer 1841. The partial geometry structure information according to the embodiments includes a RAHT initial coefficient (e.g., the number of voxels transmitted to perform partial geometry decoding from any octree depth).

The attribute coder 1840 according to the embodiments delivers the transformed attribute to the entropy coder 1850. The scalable coding information (or partial geometry information included in the scalable coding information) according to the embodiments is transmitted to the reception device through an attribute bitstream, a geometry bitstream, or a separate additional bitstream. In addition, the scalable coding information (or the partial geometry structure information included in the scalable coding information) is transmitted to the reception device as metadata through a final bitstream (e.g., the bitstream described with reference to FIG. 1). Also, the scalable coding information (or the partial geometry structure information included in the scalable coding information) according to the embodiments is transmitted to the reception device through an encapsulation unit (e.g., an encapsulation unit such as a file or segment described with reference to FIG. 14), which is at the system level. Accordingly, the reception device may perform scalable attribute decoding based on the partial geometry structure information even when the geometry structure information is not entirely provided.

According to embodiments, a geometry bitstream may include the entire geometry. Also, the geometry bitstream according to the embodiments may include a partial geometry (or a partial geometry bitstream) for scalable coding. According to embodiments, an attribute bitstream may include the entire attribute. According to embodiments, an attribute bitstream may include a partial attribute (or a partial attribute bitstream) for scalable coding.

Figure 19:
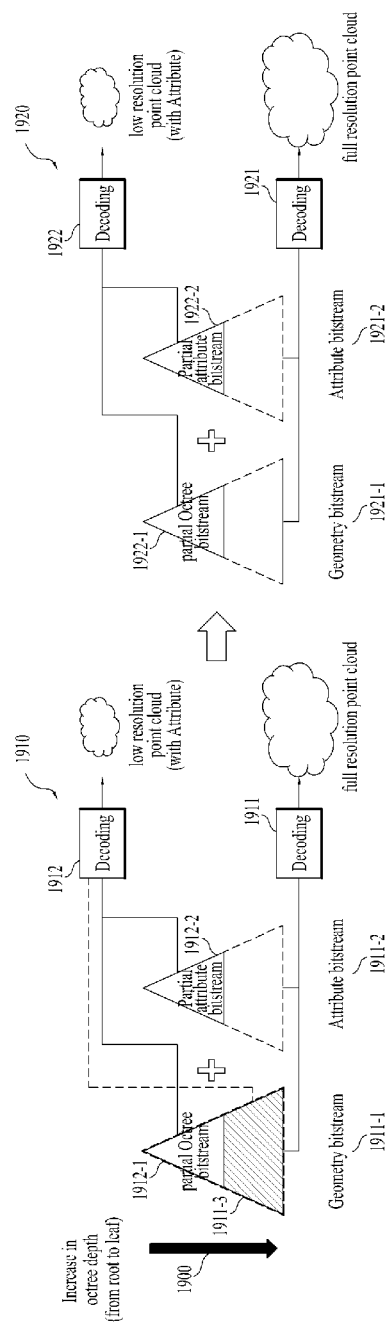
FIG. 19 illustrates an example of scalable decoding according to embodiments.

FIG. 19 illustrates an example of scalable decoding according to embodiments.

FIG. 19 illustrates an example of scalable decoding of a point cloud decoder (e.g., the point cloud video decoder 10006 described with reference to FIG. 10 or the point cloud decoder described with reference to FIG. 11) according to embodiments. An arrow 1900 shown in the figure represents a direction in which the depth of an octree structure of geometry increases. The highest node of the octree structure according to the embodiments corresponds to the lowest depth or the first depth, and is called a root. The lowest node of the octree structure according to the embodiments corresponds to the highest depth or the last depth and is called a leaf. The depth of the octree structure according to the embodiments increases in the direction from the root to the leaf.

The left part of FIG. 19 shows an example 1910 of scalable decoding. Depending on the performance, the point cloud decoder according to the embodiments performs decoding 1911 for providing full-resolution point cloud content or decoding 1912 for providing low-resolution point cloud content. In order to provide full-resolution point cloud content, the point cloud decoder decodes a geometry bitstream 1911-1 and an attribute bitstream 1911-2, which correspond to the entire octree structure (1911). In order to provide low-resolution point cloud content, the point cloud decoder decodes a partial geometry bitstream 1912-1 and a partial attribute bitstream 1912-2, which correspond to a part of the octree structure (1912). As described with reference to FIG. 18, attribute decoding is performed based on geometry decoding. Accordingly, even when the point cloud decoder decodes an attribute corresponding to the partial attribute bitstream 1912-2, the point cloud decoder is required to decode the entire geometry bitstream 1911-1 (i.e., from the root depth to the leaf depth). That is, in the figure, the shaded portion 1911-3 corresponds to geometry information that is not displayed, but are transmitted and decoded to decode the attribute corresponding to the partial attribute bitstream 1912-1.

Accordingly, the total bitstream to be transferred is represented as the sum of a geometry bitstream to be presented (e.g., the partial geometry bitstream 1912-1), an additional geometry bitstream not to be presented but to be used for attribute coding (e.g., the shaded portion 1911-3 in the figure), and an attribute bitstream to be presented (e.g. the attribute bitstream 1911-2 or the partial attribute bitstream 1912-2).

In addition, the total processing time is represented as the sum of a geometry decoding time for presentation, an additional geometry decoding time not for the presentation but for attribute coding, and an attribute decoding time to be presented. Such decoding may cause unnecessary delay in providing point cloud content.

The right part of FIG. 19 shows an example 1920 of scalable decoding. The point cloud decoder according to the embodiments performs decoding 1921 for providing full-resolution point cloud content or decoding 1922 for providing low-resolution point cloud content, depending on performance. In order to provide full-resolution point cloud content, the point cloud decoder decodes a geometry bitstream 1921-1 and an attribute bitstream 1921-2, which corresponds to the entire octree structure (1921). In order to provide low-resolution point cloud content, the point cloud decoder decodes a partial geometry bitstream 1922-1 and a partial attribute bitstream 1922-2, which correspond to a part of the octree structure (1922). As described with reference to FIG. 18, the point cloud encoder according to the embodiments generates scalable coding information (e.g., partial geometry structure information). The scalable coding information according to the embodiments is transmitted to the reception device. Accordingly, the point cloud decoder according to the embodiments may receive and decode only the partial geometry bitstream 1922-1 based on the scalable coding information to decode the partial attribute bitstream 1922-2. The scalable coding information according to the embodiments is the same as or similar to the scalable coding information described with reference to FIG. 18, and thus a detailed description thereof will be omitted.

Accordingly, the total bitstream to be transferred is represented as the sum of a geometry bitstream to be presented (e.g., the partial geometry bitstream 1922-1) and an attribute bitstream to be presented (e.g. the partial attribute bitstream 1922-2).

In addition, the total processing time is represented as the sum of a geometry decoding time for presentation and an attribute decoding time to be presented. Accordingly, the reception device may efficiently perform scalable decoding.

Figure 20:
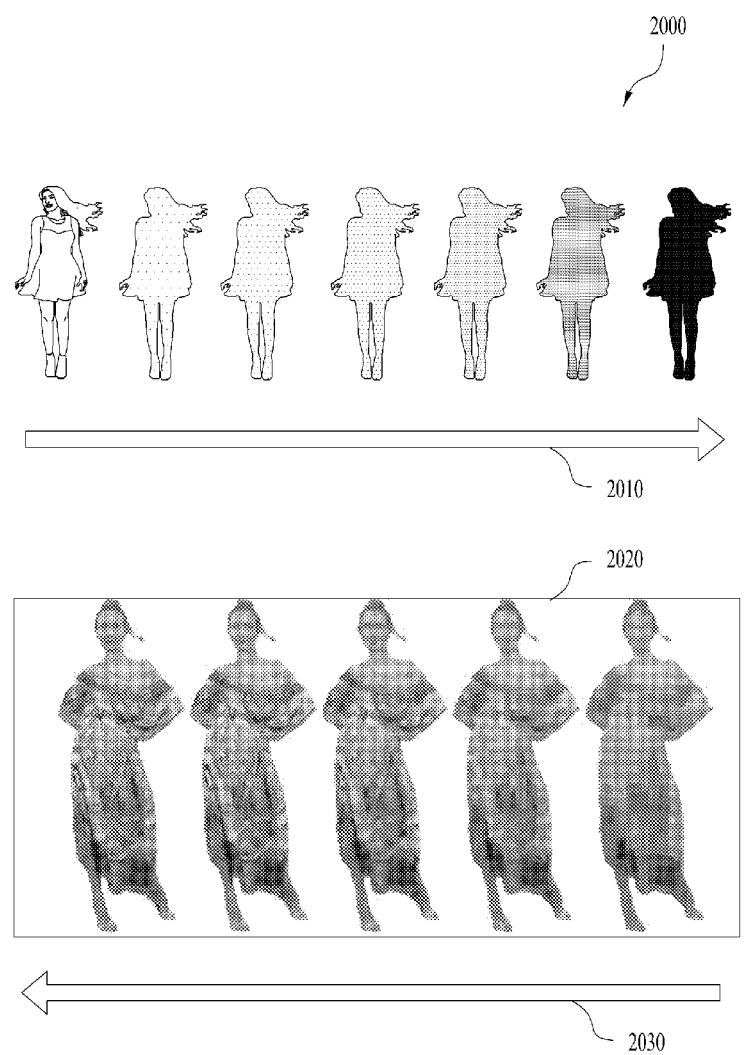
FIG. 20 illustrates details of geometry and attributes according to scalable decoding according to embodiments.

FIG. 20 illustrates details of geometry and attributes according to scalable decoding according to embodiments.

The upper part of FIG. 20 shows an example 2000 of the detail of geometry according to scalable decoding. A first arrow 2010 indicates a direction from a higher-level node to a lower-level node of the octree. As shown in the figure, when scalable decoding is performed from a higher-level node to lower-level nodes of the octree, the number of points increases, and thus the detail of the geometry increases. The leaf node of the octree structure corresponds to the highest-level detail of the geometry.

The lower part of FIG. 20 shows an example 2020 of the detail of an attribute according to scalable decoding. A second arrow 2030 indicates a direction from a higher-level node to a lower-level node of the octree. As shown in the figure, when scalable decoding is performed from a higher-level node to lower-level nodes of the octree, the detail of the attribute increases.

As described with reference to FIG. 19, the reception device may perform scalable decoding according to decoding performance. The reception device may selectively perform scalable decoding on the geometry and attribute up to a specific level of the octree structure (e.g., a depth of the octree structure) to provide point cloud content of different resolutions. The reception device according to the embodiments performs geometry scalable decoding and attribute scalable decoding according to the same level of the octree structure. In addition, the reception device according to the embodiments performs attribute scalable decoding having a level different from the octree structure level corresponding to geometry scalable decoding. For example, the level for geometry scalable decoding may be 1, and the level for attribute scalable decoding may be 1-1. Also, the level for attribute scalable decoding according to the embodiments may be defined as a depth or level according to a technique for attribute information prediction. The attribute according to the embodiments may match a node of the octree structure or may match an attribute of an actually occupied leaf node position.

As described with reference to FIG. 9, the point cloud encoder (e.g., the RAHT transformer 40008) according to the embodiments may use an attribute associated with a node at a lower level of the octree to perform RAHT coding for predicting the attributes of nodes at higher levels coding.

The RAHT transform coding according to the embodiments may be applied to attributes of occupied points of point cloud data and generate transform coefficients, or may be applied to prediction residuals for the attributes of the occupied points of the point cloud data and generate transform coefficients. The prediction residuals according to the embodiments indicate differences between predicted values and original values of corresponding attributes. Accordingly, the RAHT transform coding according to the embodiments is performed based on a geometry structure (e.g., an octree structure indicating which point is an occupied point).

A point cloud encoder (e.g., the point cloud encoder 1800 of FIG. 18, the attribute coder (e.g., the attribute coder 1840) included in the point cloud encoder, or the RAHT transformer (e.g., the RAHT transformer 40008)) according to the embodiments performs RAHT coding based on attributes corresponding to level l (or RAHT depth level l) to predict attributes of level l−1.

An octree according to embodiments has a hierarchical structure. The root, which is the highest node of the octree, has the lowest level value (e.g., 0). The level value increases toward the lower nodes. Level l according to the embodiments corresponds to the lowest node or a node higher than the lowest node in the structure (e.g., octree structure) of the point cloud data, and level l−1 corresponds to a higher node for the node to which level l corresponds.

That is, RAHT coding according to the embodiments is performed from a high depth to a lower depth of the octree structure (or from a lower node to a higher node of the octree structure). The point cloud encoder according to the embodiments combines the attributes of the occupied points of level l, and passes the combined attributes (e.g., lowpass coefficients) with level l−1, which is the next lower level. The RAHT coding according to the embodiments generates highpass coefficients that may be used to reconstruct attributes of level l along with the combined attributes. The point cloud encoder may perform attribute encoding on the generated highpass coefficients and transmit the encoded results to the reception device. The RAHT combines the attributes of the occupied points of level l−1 and passes the combined attributes with level l−2, which is the next lower level. The RAHT coding generates highpass coefficients that are used to reconstruct the attributes of level l−1 along with the combined attributes. According to embodiments, the RAHT coding may repeat the above-described procedure from level l to level 1 (one) according to the octree structure. Level 1 according to the embodiments may correspond to the root of the octree structure representing the entire 3D space. Accordingly, the RAHT coding may combine the smallest voxels into successive larger voxels.

The point cloud decoder according to the embodiments (e.g., the reception device 10004 of FIG. 1, the point cloud decoder of FIGS. 10 and 11, or, for example, the attribute coder 1840 or the prediction/lifting/RAHT inverse transform processor 13009) performs inverse RAHT coding. The inverse RAHT coding is performed in a direction opposite to that of RAHT coding. That is, the inverse RAHT coding is performed from a lower depth (e.g., the root) to a higher depth (e.g., the leaf) of the octree structure. Accordingly, the inverse RAHT coding uses the attributes of level l to predict the attributes of higher level l+1. Level l according to the embodiments may correspond to the lowest depth of the octree structure or a higher depth of the lowest depth. The inverse RAHT coding reconstructs the attributes of the occupied points of level l, and passes the reconstructed attributes to level l+1, which is the next higher level. Also, to reconstruct the attributes of level l, the inverse RAHT coding uses highpass coefficients for level l and lowpass coefficients for the lowest level, or uses the attributes passed from low level l−1. The inverse RAHT coding at the next higher level, l+1, repeats the operation for reconstructing the attributes, and passes the reconstructed attributes to the next higher level l+2. The inverse RAHT coding according to embodiments repeats the above-described procedure from level 1 to level L according to the octree structure. Level L according to the embodiments may correspond to the leaf of the octree structure representing the entire 3D space.

Accordingly, the inverse RAHT coding splits the root for the entire 3D space into successive small voxels until the smallest voxels are reached.

FIG. 21 shows an example of a transform of RAHT coding according to embodiments.

Example 2100 of FIG. 21 is an example of transformation of RAHT coding for points positioned in a two-dimensional space. Although the points of the point cloud content according to the embodiments are positioned in a 3D space, example 2100 of points positioned in a 2D space will be described for simplicity.

In the figure, (a) shows attributes of points positioned within a 4×4 block in a two-dimensional space. The attributes include attributes for a total of eight occupied points. In the figure, a0, . . . , a8 represents the attributes of the respective occupied points. Blanks indicate that there are no occupied points. (a) may correspond to an arbitrary depth (e.g., level l) (e.g., an arbitrary depth of the octree structure).

Transform according to embodiments is applied to pairs of attributes that are horizontally adjacent to each other within a 4×4 block. When a pair includes one point, the attributes for the respective points are passed to the next lower level (e.g., level l−1) as lowpass coefficients. When a pair includes two points, RAHT coding applies a transform matrix (e.g., the RAHT transform matrix described with reference to FIG. 9) to the pair to generate a lowpass coefficient and a highpass coefficient. As described with reference to FIG. 9, a transform matrix according to embodiments is composed of elements that are based on weights associated with points constituting a pair. The weight according to the embodiments indicates the number of occupied points or the number of combined occupied points. Accordingly, the weights of the attributes according to the embodiments may be set to 1 and are changeable.

In the figure, (b) and (c) show coefficients generated by performing the transform operation on pairs of attributes horizontally adjacent to each other (e.g., a pair including a0, a pair including a6 and a7, etc.) in a 4×4 block. (b) shows lowpass coefficients, and (c) shows highpass coefficients. Since there are no points horizontally adjacent to a0, a1, a2, a3, a4, and a5 in the 4×4 block, a0, a1, a2, a3, a4, and a5 each correspond to independent pairs, and are thus passed as lowpass coefficients. The numbers in parentheses of the lowpass coefficients shown in (b) indicate weights as numbers of combined attributes. Accordingly, the numbers in parentheses of the lowpass coefficients corresponding to a0, a1, a2, a3, a4 and a5 are 1. A pair including a6 and a7 contains two points, and thus a transform matrix is applied thereto. An exemplary equation 2110 shown in the figure represents a procedure of generating a lowpass coefficient b0 and a highpass coefficient c0 by applying a transform matrix T11 to the pair of attributes a6 and a7. The lowpass coefficient b0, which corresponds to a6 and a7, has a weight of 2 because it is a combination of the two attributes. Thus, the number in parentheses is 2. As shown in (c), the number in parentheses of the highpass coefficient c0, which corresponds to a6 and a7, is 2. (b) and (c) correspond to an arbitrary depth (e.g., level l−1) lower than the depth corresponding to (a).

The lowpass coefficients of (b) are transformed like the attributes. (d) and (e) show lowpass and highpass coefficients generated by transforming a pair of coefficients vertically adjacent to each other with respect to the lowpass coefficients of (b).

(d) shows lowpass coefficients, and (e) shows highpass coefficients. An exemplary equation 2120 shown in the figure represents a procedure of generating lowpass coefficients d0, d1, and d2 and highpass coefficients e0, e1, and e2 by applying a transform matrix to each of the pairs of a1 and a2, a3 and a5, and a4 and b0, which are vertically adjacent, respectively. As shown in (d), the lowpass coefficients d0 and d1 have a weight of 2 because two attributes having a weight of 1 are combined. Accordingly, the number in parentheses is updated to 2. The weight of the lowpass coefficient d2 is 3 because an attribute having a weight of 2 and an attribute having a weight of 1 are combined. Accordingly, the number in parentheses is updated to 3. As shown in (e), the highpass coefficients e0 and e1 have a weight of 2 because two attributes having a weight of 1 are combined. Accordingly, the number in parentheses is updated to 2. The weight of the highpass coefficient e2 is 3 because an attribute having a weight of 2 and an attribute having a weight of 1 are combined. Accordingly, the number in parentheses is updated to 3. (d) and (e) correspond to an arbitrary depth (e.g., level 1-2) lower than the depth corresponding to (b) and (c).

(f) and (g) respectively show lowpass and highpass coefficients generated by transforming a pair of horizontally adjacent coefficients of the lowpass coefficients of (d). (f) shows lowpass coefficients f0 and f1 generated by applying transform to a0 and d0 shown in (d), and (g) shows highpass coefficients g0 and g1. An exemplary equation 2130 shown in the figure represents a procedure of generating a lowpass coefficients f0 and f1 and highpass coefficients g0 and g1 by applying a transform matrix to pairs of a0 and d0 and a1 and d1 which are horizontally adjacent among the lowpass coefficients of (d), respectively. The process for the fields. As shown in (f) and (g), the weights of the lowpass coefficient f0 and the highpass coefficient g0 are 3 because an attribute having a weight of 1 and an attribute having a weight of 2 are combined. Accordingly, the number in parentheses is updated to 3. As shown in (f) and (g), the weights of the lowpass coefficient f1 and the highpass coefficient g1 are 5 because an attribute having a weight of 2 and an attribute having a weight of 3 are combined. Accordingly, the number in parentheses is updated to 5. (f) and (g) correspond to an arbitrary depth (e.g., level 1-3) lower than the depth corresponding to (d) and (e).

(h) shows lowpass and highpass coefficients generated by transforming a pair of vertically adjacent coefficients of (f). (h) shows a lowpass coefficients h0 and a highpass coefficient i0 generated by applying transform to the lowpass coefficients f0 and f1 shown in (f). An exemplary equation 2140 shown in the figure represents a procedure of generating the lowpass coefficient h0 and the highpass coefficient i0 by applying a transform matrix to the lowpass coefficients f0 and f1 of (f). As shown in (h), the weights of the lowpass coefficient h0 and the highpass coefficient i0 are 8 because an attribute having a weight of 3 and an attribute having a weight of 5 are combined. Accordingly, the number in parentheses is updated to 8. (h) corresponds to an arbitrary depth (e.g., level 1-4) lower than the depth corresponding to (f) and (g).

The weights according to the embodiments may be used in defining a transform coefficient for each step. The weight value (e.g., 8) of the final coefficient is equal to the number of occupied points (8). The point cloud encoder (e.g., the point cloud encoder 1800 of FIG. 18, the attribute coder (e.g., the attribute coder 1840) included in the point cloud encoder 1800, or a RAHT transformer (e.g., the RAHT transformer 40008)) according to the embodiments may perform attribute coding, such as quantization and entropy coding, on the generated highpass coefficients, i.e., c0, e0, e2, g0, g1, and i0. The transmission device according to the embodiments (e.g., the transmission device 10000 described with reference to FIG. 1 or the transmission device described with reference to FIG. 12) may transmit the highpass coefficients (e.g., c0, e0, e2, g0, g1, and i0) generated in the respective steps (or levels corresponding to the steps) and the final lowpass coefficient (e.g., h0) to the reception device.

The reception device according to the embodiments (e.g., the reception device 10004 of FIG. 1, or the point cloud decoder of FIGS. 10 and 11, the RAHT transformer 11007, or the point cloud decoder described with reference to FIG. 19) performs inverse RAHT coding based on the received highpass coefficients and final lowpass coefficients. That is, the reception device according to the embodiments generates the lowpass coefficients f0 and f1 based on the lowpass coefficient h0 and the highpass coefficient i0. The lowpass coefficient h0 and the highpass coefficient i0 according to the embodiments correspond to the lowest level or an arbitrary level l (or an arbitrary depth of the octree structure). The reception device generates lowpass coefficients a0, d0, d1, and d2 based on the generated lowpass coefficients f0 and f1 and the received highpass coefficients g0 and g1. The lowpass coefficients f0 and f1 and the highpass coefficients g0 and g1 according to the embodiments may correspond to level l+1 higher than level l. The reception device generates lowpass coefficients a0, a1, a2, a3, a4, a5, and b0 based on the generated lowpass coefficients a0, d0, d1, and d2 and the received highpass coefficients e0, e1, and e2. The lowpass coefficients a0, d0, d1, and d2 and the received highpass coefficients e0, e1, and e2 according to the embodiments may correspond to level l+2. The reception device generates final attributes a0, a1, a2, a3, a4, a5, a6 and a7 based on the generated lowpass coefficients a0, a1, a2, a3, a4, a5 and b0 and the received highpass coefficients c0. The lowpass coefficients a0, a1, a2, a3, a4, a5 and b0 and the received highpass coefficients c0 correspond to level l+3, and the final attributes a0, a1, a2, a3, a4, a5, a6 and a7 correspond to level l+4. That is, the reception device may configure a transform matrix based on weight values, calculate a weight value for each level using the transform matrix, and generate coefficients corresponding to each level.

As described with reference to FIG. 9, the weight value may be calculated through a RAHT transform matrix. That is, the weight value may be calculated based on geometry occupancy information. Accordingly, the attributes encoding and decoding may be enabled after encoding and decoding of the geometry. Such a configuration may cause a delay in a system requiring high-speed data processing and increase the complexity of the calculation process.

As described above, the reception device according to the embodiments performs inverse RAHT coding for scalable decoding (or scalable attribute decoding). For example, the reception device may generate attributes (e.g., a0, d0, d1, and d2 shown in (d) of FIG. 21) corresponding to a 2×2 block corresponding to a lower resolution than a 4×4 block. In addition, the reception device may receive the lowpass coefficient h0 and the highpass coefficients i0, g0, g1, e0, e1, and e2. As described with reference to FIGS. 18 to 20, the transmission device according to the embodiments transmits scalable coding information. The scalable coding information according to the embodiments may include weight information (e.g., 1, 2, 2, and 3) for the finally generated attributes a0, d0, d1, and d2 and depth information or level information (e.g., level 1-2 of the octree structure) corresponding to the attributes.

FIG. 22 shows an example of a RAHT transform for scalable decoding according to embodiments.

As described with reference to FIGS. 18 to 21, attribute decoding is performed based on geometry decoding. Accordingly, the point cloud decoder according to the embodiments (e.g., the point cloud video decoder 10006 described with reference to FIG. 10, the point cloud decoder described with reference to FIG. 11, or the point cloud decoder described with reference to FIG. 19) may perform RAHT transform independent from the geometry structure information for scalable decoding. The RAHT transform of FIG. 22 is an embodiment of the RAHT transform described with reference to FIGS. 18 to 21 as RAHT transform independent from the geometry structure information. As described above, the weight for each attribute is expressed as the number of attributes used to calculate the value thereof. Accordingly, the weight value varies among the depths (or levels) of the octree structure, and geometry information (occupied point information) up to the leaf node is required. Also, the transform matrix according to the embodiments is determined based on the weight value of the corresponding level. Accordingly, the point cloud encoder and decoder according to the embodiments may use a weight having a fixed value (e.g., 1) for attributes of all levels.

Example 2200 in the figure shows a transform matrix when weights w1 and w2 are fixed to 1. The transform according to the embodiments takes the form of Haar wavelet transform for the attributes of all levels. Example 2200 in the figure represents a transform matrix that is not associated with a geometry structure. Accordingly, the point cloud decoder according to the embodiments may perform scalable decoding by securing only information about necessary levels rather than securing the entire geometry structure information. The scalable coding information according to the embodiments described with reference to FIGS. 18 to 21 may include information about a fixed weight (e.g., information about whether a fixed weight is present). The point cloud decoder according to the embodiments performs scalable decoding based on scalable coding information.

Example 2210 shown in the figure represents a transform matrix given when weights w1 and w2 are fixed to arbitrary values (a and b). The scalable coding information according to the embodiments described with reference to FIGS. 18 to 21 may include information about a fixed weight for a transform (e.g., presence/absence of a fixed weight and/or a fixed weight value). The point cloud decoder according to the embodiments performs scalable decoding based on the scalable coding information. The scalable coding information for scalable decoding according to the fixed weight described with reference to FIG. 22 may not include the partial geometry structure information described with reference to FIG. 18. Accordingly, the reception device according to the embodiments performs scalable decoding without processing the partial geometry structure information, thereby more quickly performing attribute decoding.

As described above, the point cloud data transmission device (e.g., the point cloud data transmission device described with reference to FIGS. 1, 11, 14 and 18) may transmit encoded point cloud data in the form of a bitstream. The bitstream according to the embodiments may include one or more sub-bitstreams.

The point cloud data transmission device may divide an image of the point cloud data into one or more packets in consideration of the error of the transmission channel, and transmit the same over the network. According to embodiments, the bitstream may include one or more packets (e.g., network abstraction layer (NAL) units). Therefore, even when some packets are lost in a poor network environment, the point cloud data reception device may reconstruct the image using the remaining packets. The point cloud data may be partitioned into one or more slices or one or more tiles to be processed. The tiles and slices according to embodiments are regions for performing point cloud compression coding by partitioning a picture of the point cloud data. The point cloud data transmission device may provide high-quality point cloud content by processing data corresponding to each region according to the importance of each partitioned region of the point cloud data. That is, the point cloud data transmission device according to the embodiments may perform point cloud compression coding having better compression efficiency and appropriate latency on data corresponding to a region important to a user.

According to embodiments, an image (or a picture) of point cloud content may be partitioned into basic processing units for point cloud compression coding. The basic processing unit for point cloud compression coding according to the embodiments may include, but is not limited to, a coding tree unit (CTU) and a brick.

A slice according to the embodiments is a region including an integer number of one or more basic processing units for point cloud compression coding and does not have a rectangular shape. The slice according to the embodiments includes data transmitted through a packet. A tile according to the embodiments is a region partitioned in a rectangular shape in the image and includes one or more basic processing units for point cloud compression coding. According to embodiments, one slice may be included in one or more tiles. Also, according to embodiments, one tile may be included in one or more slices.

The bitstream according to the embodiments may include signaling information including a sequence parameter set (SPS) for sequence-level signaling, a geometry parameter set (GPS) for signaling of geometry information coding, an attribute parameter set (APS) for signaling of attribute information coding, and a tile parameter set (TPS) for tile-level signaling, and one or more slices.

The SPS according to the embodiments is encoding information about the entire sequence including a profile and a level, and may include comprehensive information about the entire file, such as a picture resolution and a video format.

According to embodiments, a slice includes a slice header and slice data. The slice data may include one geometry bitstream (Geom00) and one or more attribute bitstreams (Attr00, Attr10). The geometry bitstream may include a header (e.g., a geometry slice header) and a payload (e.g., a geometry slice data). The header of the geometry bitstream according to the embodiments may include identification information (geomgeom_parameter_set_id) for a parameter set included in the GPS, a tile identifier (geom_tile id), a slice identifier (geom_slice_id), and information related to the data included in the payload. The attribute bitstream may include a header (e.g., an attribute slice header or an attribute brick header) and a payload (e.g., attribute slice data or attribute brick data).

As described with reference to FIGS. 18 to 22, the point cloud encoder according to the embodiments may generate scalable coding information. Accordingly, the bitstream includes scalable coding information. The point cloud decoder according to the embodiments performs scalable decoding based on the scalable coding information.

The scalable coding information included in the bitstream according to the embodiments may be generated by the metadata processor or transmission processor (e.g., the transmission processor 12012 in FIG. 12) included in the point cloud encoder, an element in the metadata processor or transmission processor, or the attribute coder 1840 described with reference to FIG. 18. The scalable coding information according to the embodiments may be generated based on a result of attribute encoding.

FIG. 23 shows an example of syntax for APS according to embodiments.

23 is an example of syntax for APS according to embodiments, and may include the following information (or fields, parameters, etc.).

aps_attr_parameter_set_id indicates an identifier for the APS for reference by other syntax elements. The value of aps_attr_parameter_set_id shall be in the range of 0 to 15, inclusive. As shown in FIG. 30, one or more attribute bitstreams are included in a bitstream, and accordingly a field (e.g., ash_attr_parameter_set_id) having the same value as aps_attr_parameter_set_id may be included in the header of each attribute bitstream. The point cloud decoder according to the embodiments may secure an APS corresponding to each attribute bitstream based on aps_attr_parameter_set_id and process the corresponding attribute bitstream.

aps_seq_parameter_set_id specifies the value of sps_seq_parameter_set_id for the active SPS. The value of aps_seq_parameter_set_id shall be in the range of 0 to 15, inclusive.

attr_coding_type indicates an attribute coding type for a given value of attr_coding_type. The value of attr_coding_type shall be equal to 0, 1, or 2 in bitstreams according to embodiments. Other values of attr_coding_type are reserved for future use by ISO/IEC. Accordingly, the point cloud decoder according to the embodiments may ignore values of attr_coding_type other than 0, 1, and 2. Among the values, 0 indicates that the attribute coding type is predicting weight lifting transform coding, 1 indicates that the attribute coding type is RAHT transform coding, and 2 indicates that the attribute coding type is fixed weight lifting transform coding.

The following is scalable coding information 2300 and 2310 related to the case where the attribute coding type is 1, that is, RAHT transform coding.

raht_scalable_attribute_coding_flag indicates whether scalable attribute coding (or scalable attribute decoding) is applicable in the reception device. The information equal to 0 indicates that scalable attribute decoding is not applied. The information equal to 1 indicates that scalable attribute decoding is applied.

The following is information for scalable attribute decoding when raht_scalable_attribute_coding_flag is equal to 1, that is, when scalable attribute decoding is applicable.

raht_depth_level_full_presentation indicates the full depth of the original attribute. The original attribute according to the embodiments means the entire attributes (e.g., the attribute bitstream 1911-2 or the attribute bitstream 1921-2 of FIG. 19). The full depth according to the embodiments may indicate an octree level or a RAHT depth level. For example, the RATH depth level is a depth level of RAHT coding for the entire attributes, and may be set to be the same as or set differently from the octree level.

raht_num_point_full_presentation indicates the number of points corresponding to the full depth of the original attribute.

num_partial_presentation indicates the total number of one or more partial presentations corresponding to one or more partial presentation levels for scalable attribute decoding. The partial presentation according to the embodiments means decoding and/or presentation of a partial attribute bitstream (e.g., the partial attribute bitstream 1912-2 or the partial attribute bitstream 1922-2 of FIG. 19). The partial presentation level according to the embodiments means a level (e.g., a depth of an octree or a depth level of RAHT) corresponding to the partial attribute bitstream. Since a presentation level is set for each partial presentation, a plurality of levels is provided when there is a plurality of partial presentations.

The following specifies information associated with a partial presentation identified by index i. Index i according to the embodiments is greater than or equal to 0 and less than a value indicated by num_partial_presentation.

raht_depth_level_partial_presentation indicates the level of scalable decoding supported by the attribute bitstream for the partial presentation indicated by index i. According to embodiments, raht_depth_level_partial_presentation corresponds to a depth of an octree or a depth level of RAHT.

raht_num_point_partial_presentation indicates the number of output points according to the level of scalable decoding supported by the current attribute bitstream applied to the partial presentation indicated by the index i.

Although not shown in the figure, the information related to the partial presentation may further include quality information about point cloud content corresponding to each level in addition to raht_depth_level_full_presentation, raht_num_point_full_presentation, raht_depth_level_partial_presentation, and raht_num_point_partial_presentation. According to embodiments, the quality information about the point cloud content may be signaled at a higher level of the PCC or a system level.

raht_non_adaptive_transform_coefficient_flag indicates whether RAHT coding is RAHT coding using a fixed transform coefficient. When the information is 1, it indicates that the RAHT coding is RAHT coding using a transform coefficient having a fixed weight (e.g., the RAHT coding described with reference to FIG. 22). When the information is 0, it indicates RAHT coding using a transform coefficient having a variable weight (e.g., the RAHT coding described with reference to FIG. 21).

The following is information related to RAHT coding using a transform coefficient having a fixed weight when raht_non_adaptive_transform_coefficient_flag is equal to 1.

raht_equal_transform_coefficient_flag indicates the value of a fixed weight. When this information is 1, it indicates that the value of the fixed weight is the same, that is, 1. Accordingly, the transform take the form of the Harr wavelet transform described with reference to FIG. 22. When the information is 0, the fixed weight has any value.

The following is related information when raht_equal_transform_coefficient_flag is equal to 0.

num_coefficient indicates the number of non-adaptive transform coefficients having a fixed weight having any value. The following is information about each coefficient. Index i is greater than or equal to 0 and less than the value indicated by num_coefficient.

non_adaptive_transform_coefficient indicates a non-adaptive transform coefficient. Transform according to embodiments corresponds to 2×2 transform or another type of transform. The scalable coding information 2300 according to embodiments may further include information indicating the type of transform (e.g., transform type).

The following is information related to RAHT coding using a transform coefficient having a variable weight (e.g., the partial geometry information described with reference to FIG. 18) when raht_non_adaptive_transform_coefficient_flag is equal to 0.

raht_geometry_octree_full_depth_level_flag indicates whether the entire geometry is transmitted and whether partial geometry is transmitted. When this information is equal to 1, it indicates that the geometry (e.g., the geometry bitstream 1911-1 or the geometry bitstream 1921-1 of FIG. 19) corresponding to the entire structure of the octree (that is, up to the full depth of the octree) is transmitted. When the information is equal to 0, it indicates that corresponding partial geometry (or partial geometry bitstream) up to a depth lower than the full depth of the octree is transmitted. Upon receiving the partial geometry, the reception device according to the embodiments may generate a geometry structure necessary for inverse transform based on information about the initial structure (e.g., the partial geometry information described with reference to FIG. 19).

The following is information about each of the aforementioned partial presentations when raht_geometry_octree_full_depth_level_flag is equal to 0. According to embodiments, i is an index indicating a partial presentation, wherein i is greater than or equal to 0, and less than the value indicated by num_partial_presentation.

raht_coeff_for_partial_presentation_depth_present_flag [i] indicates whether RAHT-based scalable attribute coding is applied to the partial presentation identified by i. When raht_coeff_for_partial_presentation_depth_present_flag is equal to 1, raht_coeff_for_partial_presentation_depth_present_flag [i] indicates that the partial presentation identified by the index i should be processed by RAHT scalable attribute coding.

When raht_coeff_for_partial_presentation_depth_present_flag is equal to 1, a RAHT coefficient bitstream corresponding to the partial presentation identified by the index i of raht_coeff_for_partial_presentation_depth_present_flag is transmitted.

When raht_coeff_for_partial_presentation_depth_present_flag is equal to 0, raht_coeff_for_partial_presentation_depth_present_flag [i] indicates that the partial presentation identified by the index i is processed by scalable attribute coding based on prediction transform coding other than RAHT.

Therefore, the reception device according to the embodiments (e.g., the reception device 10004 of FIG. 1, the point cloud decoder of FIGS. 10 and 11, or the reception device of FIG. 13) may perform scalable attribute decoding based on the information about the number of voxels even without information about the entire structure of the geometry octree. In full depth attribute decoding, not scalable attribute decoding, the weight of each voxel may be set to 1, and the weight value of a higher node may be calculated based on the weight value of the lower node based on the transform of the RAHT coding (e.g., Example 2100 of transform described with reference to FIG. 21).

According to embodiments, the scalable coding information may further include a separate syntax different from the syntax shown in FIG. 23. The separate syntax according to the embodiments may include information capable of linking a parameter set and information about a slice.

raht_depth indicates the number of LODs for RAHT conversion. raht_depth has a value in the range of 1 to xx.

raht_quant_step_size indicates a quantization step size for the first component of the attribute. rate_quant_step_size has a value within the range of 1 to xx.

raht_quant_step_size_chroma is information used when a separate quantization step size is applied to a chrominance channel.

aps_extension_present_flag is a flag having a value of 0 or 1.

aps_extension_present_flag equal to 1 indicates that the aps_extension_data syntax structure is present in the APS RBSP syntax structure. aps_extension_present_flag equal to 0 indicates that this syntax structure is not present. When the syntax structure is not present, the value of aps_extension_present_flag is inferred to be equal to 0.

aps_extension_data_flag may have any value. The presence and value of this field may not affect decoding performance of the decoder according to the embodiments.

FIG. 24 shows an example of syntax for an attribute slice bitstream according to embodiments.

The first syntax 2400 shown in FIG. 24 is an exemplary syntax for an attribute slice bitstream according to embodiments. The attribute slice bitstream includes attribute_slice_header and attribute_slice_data.

The second syntax 2410 shown in FIG. 24 is an exemplary syntax for an attribute header according to embodiments. The syntax for the attribute header may include the following information (or fields, parameters, etc.).

ash_attr_parameter_set_id has the same value as aps_attr_parameter_set_id of active APSs (e.g., aps_attr_parameter_set_id included in the syntax for APS described with reference to FIG. 23).

ash_attr_sps_attr_idx identifies an attribute set included in an active SPS. The value of ash_attr_sps_attr_idx shall be in the range of 0 to the value of sps_num_attribute_sets included in the active SPS.

ash_attr_geom_slice_id indicates the value of a geometry slice ID (e.g. geom_slice_id).

The third syntax 2420 shown in FIG. 24 is an exemplary syntax for attribute slice data according to embodiments. The syntax for the attribute slice data may include the following information.

dimension=attribute_dimension[ash_attr_sps_attr_idx] indicates the attribute dimension (attribute_dimension) of a set of attributes identified by ash_attr_sps_attr_idx. The attribute_dimension specifies the number of components constituting the attribute. An attribute according to the embodiments indicates reflectance, color, or the like. Accordingly, the number of components that an attribute differs among the attributes. For example, an attribute corresponding to color may have three color components (e.g., RGB). Accordingly, the attribute corresponding to reflectance may be a mono-dimensional attribute, and the attribute corresponding to color may be a three-dimensional attribute.

When scalable attribute decoding according to the embodiments is applicable for each slice, the syntax for attribute slice data includes a bitstream according to the attribute coding type.

When attr_coding_type (e.g., attr_coding_type described with reference to FIG. 23) is equal to 0, the attribute coding type is predicting weight lifting transform coding. Accordingly, the syntax for attribute data includes PredictingWeight_Lifting_bitstream(dimension).

When attr_coding_type (e.g., attr_coding_type described with reference to FIG. 23) is equal to 1, the attribute coding type is RAHT transform coding. Accordingly, when raht_coeff_for_partial_presentation_depth_present_flag [i] (raht_coeff_for_partial_presentation_depth_present_flag [i] included in the APS described with reference to FIG. 23) is equal to 1 for the partial presentation identified by the index i, the syntax for attribute data includes RAHT_coeff_bitstream(raht_num_point_partial_presentation[index]) for the corresponding partial presentation and RAHT_bitstream(dimension) of the above-described dimension.

When attr_coding_type (e.g., attr_coding_type described with reference to FIG. 23) is equal to 2, the attribute coding type is fixed predicting weight lifting transform coding. Thus, the syntax for attribute data includes FixedWeight_Lifting_bitstream(dimension).

The fourth syntax 2430 shown in FIG. 24 is an exemplary syntax for the RAHT coefficient bitstream. The syntax for the RAHT coefficient bitstream includes num_descendent_voxels[j] corresponding to index j for the partial presentation identified by index i. According to embodiments, j may indicate one or more levels or depths corresponding to the partial presentation. The value of j is greater than or equal to 0 and less than the value of raht_num_point_partial_presentation.

num_descendent_voxels indicates the number of voxels corresponding to child nodes associated with each presented node. As described with reference to FIGS. 18 to 22, RAHT coding uses a weight value to apply transform at each level. At each level, the points of the point cloud data are represented by voxels. The weight value according to the embodiments is calculated based on the number of voxels at each level. In the case of full depth attribute decoding, the reception device according to the embodiments may set the weight to 1 for each voxel and apply transform to calculate the weight of the higher node based on the weight of the lower node. However, when the geometry octree structure cannot be entirely identified as in scalable attribute decoding, the reception device according to the embodiments may apply transform stating at an intermediate depth (or level) based on num_descendent_voxels to calculate the weight of the higher node. As described with reference to FIG. 21, the reception device according to the embodiments performs inverse RAHT coding for scalable decoding (or scalable attribute decoding). For example, the reception device may generate attributes (e.g., a0, d0, d1, and d2 shown in (d) of FIG. 21) corresponding to a 2×2 block corresponding to a lower resolution than a 4×4 block. The reception device may receive a lowpass coefficient h0 and highpass coefficients i0, g0, g1, e0, e1, and e2. In this case, the reception device cannot know the geometry information (e.g., the number of nodes used for each data position, etc.), and accordingly it may generate weight information based on num_descendent_voxel transmitted through the above-described RAHT coefficient bitstream. Accordingly, the reception device may estimate a transform matrix (e.g., the transform matrix described with reference to FIG. 21) based on the received lowpass coefficient h0 and highpass coefficients i0, g0, g1, e0, e1 and e2, and generate weight information based on num_descendent_voxel to reconstruct an attribute corresponding to a level equal to or lower than the level indicated by raht_depth_level_partial_presentation (scalable decoding).

Figure 25:
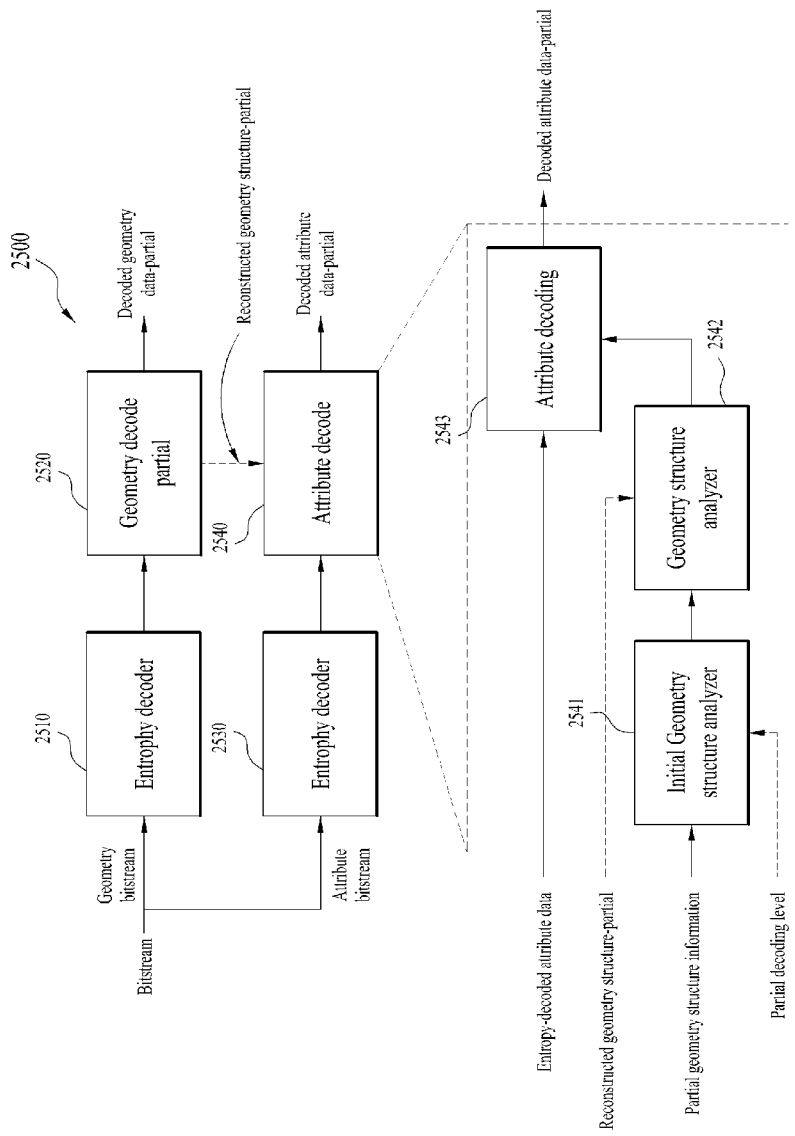
FIG. 25 is a block diagram illustrating an example of a point cloud decoder.

FIG. 25 is a block diagram illustrating an example of a point cloud decoder. A point cloud decoder 2500 according to the embodiments performs an operation corresponding to the reverse process of the operation of the point cloud encoder 1900 described with reference to FIG. 18.

The point cloud decoder 2500 (e.g., the point cloud video decoder 10006 described with reference to FIG. 10, the point cloud decoder described with reference to FIG. 11, the point cloud decoder described with reference to FIG. 19, or the like) according to the embodiments described with reference to FIG. 19 may perform the decoding operation described with reference to FIGS. 1 to 24. In addition, the point cloud decoder 2500 according to the embodiments may perform the scalable coding described with reference to FIGS. 18 to 24. The point cloud decoder 2500 according to the embodiments includes an entropy decoder 2510, a geometry decoder 2520, an entropy decoder 2530, and an attribute decoder 2540. Although not shown in FIG. 25, the point cloud decoder 2500 according to the embodiments may further include one or more elements configured to perform the decoding operation described with reference to FIGS. 1 to 24.

The bitstream according to the embodiments (e.g., the bitstream described with reference to FIGS. 23 and 24) includes a geometry bitstream and an attribute bitstream. The geometry bitstream according to the embodiments may include the entire geometry, and may include a partial geometry. The entropy decoder 2510 and the geometry decoder 2520 according to the embodiments perform the geometry decoding described with reference to FIGS. 1 to 24. Also, the entropy decoder 2510 and the geometry decoder 2520 according to the embodiments perform scalable geometry decoding described with reference to FIGS. 1 to 24 according to decoding performance. Accordingly, the entropy decoder 2510 performs entropy decoding on the geometry bitstream and outputs entropy-decoded geometry data. The geometry decoder 2520 decodes the entropy-decoded geometry data. The geometry decoder 2520 decodes the entire geometry data or performs partial geometry decoding for decoding partial geometry data. FIG. 25 illustrates an example in which the geometry decoder 2520 performs partial geometry decoding and outputs decoded partial geometry data. Also, the geometry decoder 2520 transfers a reconstructed geometry structure to the attribute decoder 2540. The operations of the entropy decoder 2510 and the geometry decoder 2520 according to the embodiments are the same as or similar to those of the arithmetic decoder 11000, the octree synthesizer 11001, the surface approximation synthesizer 11002, the geometry reconstructor 11003, and the coordinate inverse transformer 11004 described with reference to FIG. 11.

The attribute bitstream according to the embodiments may include the entire attributes and may include partial attributes. The entropy decoder 2530 and the attribute decoder 2540 according to the embodiments perform the attribute decoding described with reference to FIGS. 1 to 24. Also, the entropy decoder 2530 and the attribute decoder 2540 according to the embodiments perform the scalable attribute decoding described with reference to FIGS. 1 to 24 according to decoding performance. Accordingly, the entropy decoder 2530 performs entropy decoding on the attribute bitstream and outputs entropy-decoded attribute data. The attribute decoder 2540 receives the reconstructed geometry structure from the geometry decoder 2520 and decodes the entropy-decoded attribute data. The operations of the entropy decoder 2530 and the attribute decoder 2540 according to the embodiments are the same as or similar to the operations of the arithmetic decoder 11005, the inverse quantizer 11006, the RAHT transformer 11007, the LOD generator 11008, the inverse lifter 11009, and/or the color inverse transformer 11010 described with reference to FIG. 11.

When the point cloud decoder according to the embodiments performs scalable decoding, the attribute decoder 2640 may not be allowed to perform scalable attribute decoding using the reconstructed geometry structure alone. Accordingly, the attribute decoder 2540 according to the embodiments performs scalable attribute decoding based on the scalable coding information (or partial geometry information included in the scalable coding information) described with reference to FIGS. 19 to 24. As described with reference to FIGS. 23 to 24, the scalable coding information according to the embodiments is transmitted through a bitstream. The scalable coding information is the same as that described with reference to FIGS. 19 to 24, and thus a description thereof is skipped.

The attribute decoder 2540 according to the embodiments includes an initial geometry structure analyzer 2541, a geometry structure analyzer 2542, and an attribute decoder 2543. Although the initial geometry structure analyzer 2541 and the geometry structure analyzer 2542 according to the embodiments are represented as separate blocks, they may be referred to as one geometry structure analyzer.

The initial geometry structure analyzer 2541 according to the embodiments secures the geometry structure information lost in scalable decoding based on the partial geometry structure information according to the partial decoding level. The geometry structure analyzer 2542 transfers the entire geometry structure to the attribute decoder 2543 based on the reconstructed geometry structure and the output information of the initial geometry structure analyzer 2541. The attribute decoder 2543 may output partial attribute data by performing scalable attribute decoding based on the entire geometry structure.

When the point cloud decoder according to the embodiments does not perform scalable geometry decoding, the reconstructed geometry structure according to the embodiments represents the entire geometry structure. Accordingly, the attribute decoder 2540 may perform scalable attribute decoding based on the output information of the geometry structure analyzer 2542 without the output information of the initial geometry structure analyzer 2541.

Figure 26:
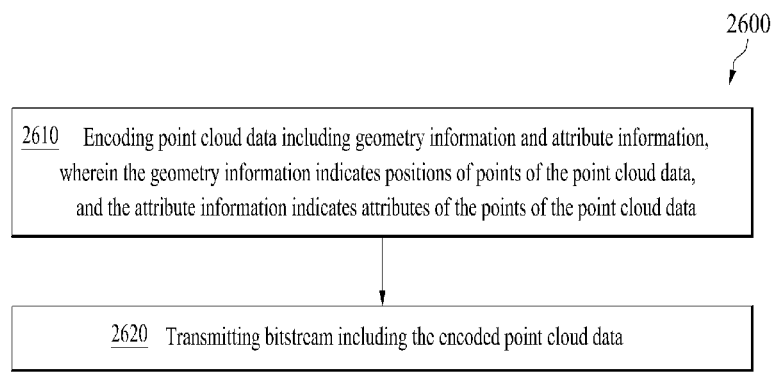
FIG. 26 is an exemplary flow diagram of a method for processing point cloud data according to embodiments.

FIG. 26 is an exemplary flow diagram of a method for processing point cloud data according to embodiments.

The flow diagram 2600 of FIG. 26 illustrates a point cloud data processing method for a point cloud data processing device (e.g., the transmission device or the point cloud data encoder described with reference to FIGS. 1, 11, 14, 15, and 18). The point cloud data processing device according to the embodiments may perform the same or similar operation to the encoding operation described with reference to FIGS. 1 to 25.

The point cloud data processing device according to embodiments may encode point cloud data including geometry information and attribute information (2610). The geometry information according to the embodiments indicates positions of the points of the point cloud data. The attribute information according to the embodiments indicates attributes of the points of the point cloud data.

The point cloud data processing device according to the embodiments may encode the geometry information and encode the attribute information. The point cloud data processing device according to the embodiments performs the same or similar operation to the geometry information encoding operation described with reference to FIGS. 1 to 25. In addition, the point cloud data processing device performs the same or similar operation to the attribute information encoding operation described with reference to FIGS. 1 to 25. The point cloud data processing device according to the embodiments may analyze the geometry structure of the geometry information and encode the attribute information based on the analyzed geometry structure. As described with reference to FIGS. 18 to 25, the attribute information corresponds to one or more depths of the geometry structure. The geometry information encoding and the attribute information encoding according to the embodiments are the same as or similar to the geometry information encoding and the attribute information encoding described with reference to FIGS. 1 to 25, and thus a detailed description thereof will be skipped.

The point cloud data processing device according to the embodiments may transmit a bitstream including the encoded point cloud data (2620).

The structure of the bitstream according to the embodiments is the same as that described with reference to FIGS. 23 to 24, and thus a detailed description thereof will be skipped. The bitstream according to the embodiments may include scalable coding information (e.g., the scalable coding information described with reference to FIGS. 23 and 24). In addition, the scalable coding information according to the embodiments may be transmitted through the APS and attribute data of an attribute slice as described with reference to FIGS. 23 and 24, and is not limited to the above-described example.

The scalable coding information according to the embodiments is used for scalable decoding for decoding a part or the entirety of the attribute information. The scalable coding information according to the embodiments may include first information (e.g., raht_scalable_attribute_coding_flag described with reference to FIG. 23) indicating whether scalable decoding is applied to the attribute information, and second information (e.g., raht_non_adpative_transform_coefficient_flag described with reference to FIG. 23) indicating whether the transform weight of the scalable coding is a fixed weight. When the second information indicates that the transform weight value is not a fixed weight, the scalable coding information may further include partial geometry structure information (e.g., raht_geometry_octree_full_depth_level_flag described with reference to FIG. 23) that is a part of the geometry structure. The scalable coding information according to the embodiments is the same as that described with reference to FIGS. 18 to 23, and thus a detailed description thereof will be skipped.

Figure 27:
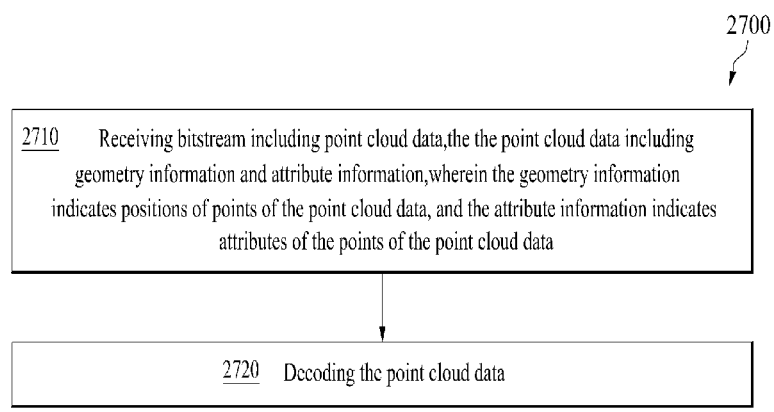
FIG. 27 is an exemplary flow diagram of a method for processing point cloud data according to embodiments.

FIG. 27 is an exemplary flow diagram of a method for processing point cloud data according to embodiments.

The flow diagram 2700 of FIG. 27 illustrates a point cloud data processing method for a point cloud data processing device (e.g., the point cloud data reception device or point cloud data decoder described with reference to FIGS. 1, 13, 14, 16, and 25). The point cloud data processing device according to the embodiments may perform the same or similar operation to the decoding operation described with reference to FIGS. 1 to 25.

The point cloud data processing device according to the embodiments receives a bitstream including point cloud data (2710). The geometry information according to the embodiments indicates positions of the points of the point cloud data. The attribute information according to the embodiments indicates attributes of the points of the point cloud data. The structure of the bitstream according to the embodiments is the same as that described with reference to FIGS. 23 to 24, and thus a detailed description thereof will be skipped.

The point cloud data processing device according to the embodiments decodes the point cloud data (2720).

The point cloud data processing device according to the embodiments may decode the geometry information and decode the attribute information. The point cloud data processing device according to the embodiments performs the same or similar operation to the geometry information decoding operation described with reference to FIGS. 1 to 25. In addition, the point cloud data processing device performs the same or similar operation to the attribute information decoding operation described with reference to FIGS. 1 to 25.

The bitstream according to the embodiments may include scalable coding information (e.g., the scalable coding information described with reference to FIGS. 23 and 24). In addition, the scalable coding information according to the embodiments may be transmitted through the APS and attribute data of an attribute slice as described with reference to FIGS. 23 and 24, and is not limited to the above-described example.

The scalable coding information according to the embodiments is used for scalable decoding for decoding a part or the entirety of the attribute information. The scalable coding information according to the embodiments may include first information (e.g., raht_scalable_attribute_coding_flag described with reference to FIG. 23) indicating whether scalable coding is applied, and second information (e.g., raht_non_adpative_transform_coefficient_flag described with reference to FIG. 23) indicating whether the transform weight of the scalable coding is a fixed weight. When the second information indicates that the transform weight value is not a fixed weight, the scalable coding information may further include partial geometry structure information (e.g., raht_geometry_octree_full_depth_level_flag described with reference to FIG. 23) that is a part of the geometry structure. The scalable coding information according to the embodiments is the same as that described with reference to FIGS. 18 to 23, and thus a detailed description thereof will be skipped. The point cloud data processing device according the to the embodiments analyzes the geometry structure of the geometry information, and decodes the attribute information based on the analyzed geometry structure and the scalable coding information. That is, the point cloud data processing device according to the embodiments may perform scalable attribute decoding. The decoding operation of the point cloud data processing device according to the embodiments is the same as that described with reference to FIGS. 1 to 25, and thus a detailed description thereof will be skipped.

Components of the point cloud data processing devices according to the embodiments described with reference to FIGS. 1 to 27 may be implemented as hardware, software, firmware, or a combination thereof including one or more processors coupled with a memory. The components of the devices according to the embodiments may be implemented as a single chip, for example, a single hardware circuit. Alternatively, the components of the point cloud data processing devices according to the embodiments may be implemented as separate chips. In addition, at least one of the components of the point cloud data processing devices according to the embodiments may include one or more processors capable of executing one or more programs, wherein the one or more programs may include are instructions that execute or are configured to execute one or more of the operations/methods of the point cloud data processing devices described with reference to FIGS. 1 to 27.

Although the accompanying drawings have been described separately for simplicity, it is possible to design new embodiments by merging the embodiments illustrated in the respective drawings. Designing a recording medium readable by a computer on which programs for executing the above-described embodiments are recorded as needed by those skilled in the art also falls within the scope of the appended claims and their equivalents. The devices and methods according to embodiments may not be limited by the configurations and methods of the embodiments described above. Various modifications can be made to the embodiments by selectively combining all or some of the embodiments. Although preferred embodiments have been described with reference to the drawings, those skilled in the art will appreciate that various modifications and variations may be made in the embodiments without departing from the spirit or scope of the disclosure described in the appended claims. Such modifications are not to be understood individually from the technical idea or perspective of the embodiments.

Descriptions of methods and devices may be applied so as to complement each other. For example, the point cloud data transmission method according to the embodiments may be carried out by the point cloud data transmission device or components included in the point cloud data transmission device according to the embodiments. Also, the point cloud data reception method according to the embodiments may be carried out by the point cloud data reception device or components included in the point cloud data reception device according to the embodiments.

Various elements of the devices of the embodiments may be implemented by hardware, software, firmware, or a combination thereof. Various elements in the embodiments may be implemented by a single chip, for example, a single hardware circuit. According to embodiments, the components according to the embodiments may be implemented as separate chips, respectively. According to embodiments, at least one or more of the components of the device according to the embodiments may include one or more processors capable of executing one or more programs. The one or more programs may perform any one or more of the operations/methods according to the embodiments or include instructions for performing the same. Executable instructions for performing the method/operations of the device according to the embodiments may be stored in a non-transitory CRM or other computer program products configured to be executed by one or more processors, or may be stored in a transitory CRM or other computer program products configured to be executed by one or more processors. In addition, the memory according to the embodiments may be used as a concept covering not only volatile memories (e.g., RAM) but also nonvolatile memories, flash memories, and PROMs. In addition, it may also be implemented in the form of a carrier wave, such as transmission over the Internet. In addition, the processor-readable recording medium may be distributed to computer systems connected over a network such that the processor-readable code may be stored and executed in a distributed fashion.

In this specification, the term "/" and "," should be interpreted as indicating "and/or." For instance, the expression "A/B" may mean "A and/or B." Further, "A, B" may mean "A and/or B." Further, "A/B/C" may mean "at least one of A, B, and/or C." Also, "A/B/C" may mean "at least one of A, B, and/or C." Further, in this specification, the term "or" should be interpreted as indicating "and/or." For instance, the expression "A or B" may mean 1) only A, 2) only B, or 3) both A and B. In other words, the term "or" used in this document should be interpreted as indicating "additionally or alternatively."

Terms such as first and second may be used to describe various elements of the embodiments. However, various components according to the embodiments should not be limited by the above terms. These terms are only used to distinguish one element from another. For example, a first user input signal may be referred to as a second user input signal. Similarly, the second user input signal may be referred to as a first user input signal. Use of these terms should be construed as not departing from the scope of the various embodiments. The first user input signal and the second user input signal are both user input signals, but do not mean the same user input signals unless context clearly dictates otherwise.

The terms used to describe the embodiments are used for the purpose of describing specific embodiments, and are not intended to limit the embodiments. As used in the description of the embodiments and in the claims, the singular forms "a", "an", and "the" include plural referents unless the context clearly dictates otherwise. The expression "and/or" is used to include all possible combinations of terms. The terms such as "includes" or "has" are intended to indicate existence of figures, numbers, steps, elements, and/or components and should be understood as not precluding possibility of existence of additional existence of figures, numbers, steps, elements, and/or components. As used herein, conditional expressions such as "if" and "when" are not limited to an optional case and are intended to be interpreted, when a specific condition is satisfied, to perform the related operation or interpret the related definition according to the specific condition.

MODE FOR DISCLOSURE

As described above, related contents have been described in the best mode for carrying out the embodiments.

INDUSTRIAL APPLICABILITY

It will be apparent to those skilled in the art that various changes or modifications can be made to the embodiments within the scope of the embodiments. Thus, it is intended that the embodiments cover the modifications and variations of this disclosure provided they come within the scope of the appended claims and their equivalents.

The invention claimed is:

1. A method for processing point cloud data by an apparatus, the method comprising:
encoding point cloud data including geometry information and attribute information, wherein the geometry information indicates positions of points of the point cloud data and the attribute information indicates attributes of the points of the point cloud data,
wherein the encoding point cloud data includes attribute encoding the attribute information by predicting the attribute information based on RAHT(Region adaptive hierarchical transform); and
transmitting a bitstream including the encoded point cloud data,
wherein the bitstream includes attribute parameter set information including a number of points for a partial RAHT.

2. The method of claim 1, wherein the encoding of the attribute information comprises:
analyzing a geometry structure of the geometry information; and
encoding the attribute information based on the analyzed geometry structure,
wherein the attribute information corresponds to one or more depths of the geometry structure.

3. The method of claim 2,
wherein the bitstream includes scalable coding information,
wherein the scalable coding information is used for scalable decoding for decoding a part or entirety of the attribute information.

4. The method of claim 3,
wherein the scalable coding information includes first information indicating whether the scalable decoding is applied to the attribute information and second information indicating whether a transform weight of the scalable coding is a fixed weight,
wherein, when the second information indicates that the transform weight is not the fixed weight, the scalable coding information further includes partial geometry structure information corresponding to a part of the geometry structure.

5. An apparatus for processing point cloud data, the apparatus comprising:
an encoder configured to encode point cloud data including geometry information and attribute information, wherein the geometry information indicates positions of points of the point cloud data and the attribute information indicates attributes of the points of the point cloud data,
wherein the encoding point cloud data includes attribute encoding the attribute information by predicting the attribute information based on RAHT(Region adaptive hierarchical transform); and
a transmitter configured to transmit a bitstream including the encoded point cloud data,
wherein the bitstream includes attribute parameter set information including a number of points for a partial RAHT.

6. The apparatus of claim 5,
wherein the encoder is configured to analyze a geometry structure of the geometry information,
wherein the encoder is configured to encode the attribute information based on the analyzed geometry structure,
wherein the attribute information corresponds to one or more depths of the geometry structure.

7. The apparatus of claim 6,
wherein the bitstream includes scalable coding information,
wherein the scalable coding information is used for scalable decoding for decoding a part or entirety of the attribute information.

8. The apparatus of claim 7,
wherein the scalable coding information includes first information indicating whether the scalable decoding is applied to the attribute information and second information indicating whether a transform weight of the scalable coding is a fixed weight,
wherein when the second information indicates that the transform weight is not the fixed weight, the scalable coding information further includes partial geometry structure information corresponding to a part of the geometry structure.

9. A method for processing point cloud data by an apparatus, the method comprising:
receiving a bitstream including point cloud data; and
decoding the point cloud data,
wherein the point cloud data includes geometry information and attribute information,
wherein the geometry information indicates positions of points of the point cloud data and the attribute information indicates one or more attributes of the points of the point cloud data,
wherein the decoding the point cloud data includes attribute decoding the attribute information by predicting the attribute information based on RAHT(Region adaptive hierarchical transform),
wherein the bitstream includes attribute parameter set information including a number of points for a partial RAHT.

10. The method of claim 9,
wherein the bitstream includes scalable coding information,
wherein the scalable coding information is used for scalable decoding for decoding a part or entirety of the attribute information.

11. The method of claim 10,
wherein the decoding of the attribute information comprises:
analyzing a geometry structure of the geometry information; and
decoding the attribute information based on the analyzed geometry structure and the scalable coding information.

12. The method of claim 11,
wherein the scalable coding information includes first information indicating whether the scalable decoding is applied to the attribute information and second information indicating whether a transform weight of the scalable coding is a fixed weight,
wherein when the second information indicates that the transform weight is not the fixed weight, the scalable coding information further includes partial geometry structure information corresponding to a part of the geometry structure.

13. An apparatus for processing point cloud data, comprising:
a receiver configured to receive a bitstream including point cloud data; and
a decoder configured to decode the point cloud data,
wherein the point cloud data includes geometry information and attribute information,
wherein the geometry information indicates positions of points of the point cloud data and the attribute information indicates one or more attributes of the points of the point cloud data,
wherein the decoding the point cloud data includes attribute decoding the attribute information by predicting the attribute information based on RAHT(Region adaptive hierarchical transform),
wherein the bitstream includes attribute parameter set information including a number of points for a partial RAHT.

14. The apparatus of claim 13,
wherein the bitstream includes scalable coding information,
wherein the scalable coding information is used for scalable decoding for decoding a part or entirety of the attribute information.

15. The apparatus of claim 14,
wherein the decoder is configured to analyze a geometry structure of the geometry information,
wherein the decoder is configured to decode the attribute information based on the analyzed geometry structure and the scalable coding information.

16. The apparatus of claim 15,
wherein the scalable coding information includes first information indicating whether the scalable decoding is applied to the attribute information and second information indicating whether a transform weight of the scalable coding is a fixed weight,
wherein, when the second information indicates that the transform weight is not the fixed weight, the scalable coding information further includes partial geometry structure information corresponding to a part of the geometry structure.

* * * * *